(12) United States Patent
Tanaka et al.

(10) Patent No.: US 11,353,783 B2
(45) Date of Patent: Jun. 7, 2022

(54) ILLUMINATION DEVICE AND PROJECTOR

(71) Applicant: SONY CORPORATION, Tokyo (JP)

(72) Inventors: Masa Tanaka, Tokyo (JP); Ryo Miyao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/258,887

(22) PCT Filed: Jul. 1, 2019

(86) PCT No.: PCT/JP2019/026114
§ 371 (c)(1),
(2) Date: Jan. 8, 2021

(87) PCT Pub. No.: WO2020/021980
PCT Pub. Date: Jan. 30, 2020

(65) Prior Publication Data
US 2021/0294194 A1   Sep. 23, 2021

(30) Foreign Application Priority Data
Jul. 24, 2018   (JP) .............................. JP2018-138366

(51) Int. Cl.
*G03B 21/20*   (2006.01)
(52) U.S. Cl.
CPC ....... *G03B 21/2013* (2013.01); *G03B 21/208* (2013.01)
(58) Field of Classification Search
CPC .......................... G03B 21/2013; G03B 21/208
(Continued)

(56) References Cited

U.S. PATENT DOCUMENTS

| 2003/0133079 A1 | 7/2003 | Cobb |
| 2009/0168424 A1 | 7/2009 | Yamauchi et al. |

(Continued)

FOREIGN PATENT DOCUMENTS

| CN | 1325965 | 12/2001 |
| CN | 103477640 | 12/2013 |

(Continued)

OTHER PUBLICATIONS

International Search Report prepared by the Japan Patent Office dated Sep. 3, 2019, for International Application No. PCT/JP2019/026114.

(Continued)

*Primary Examiner* — Jerry L Brooks
(74) *Attorney, Agent, or Firm* — Sheridan Ross P.C.

(57) ABSTRACT

An illumination device of the present disclosure includes: a first light source unit that emits first light of a first wavelength band; a first spatial light modulator where the first light from the first light source unit enters; a second light source unit that emits second light of a second wavelength band; an integrator optical system including a first fly-eye lens where the second light from the second light source unit enters and generating illumination light for an illumination target on a basis of the first light having been modulated by the first spatial light modulator and the second light from the second light source unit; and a multiplexing optical system that multiplexes the second light having entered the first fly-eye lens and the first light having been modulated by the first spatial light modulator, in an optical path between the first fly-eye lens and the illumination target.

20 Claims, 19 Drawing Sheets

(58) Field of Classification Search
USPC .......................................................... 353/94
See application file for complete search history.

(56) References Cited

U.S. PATENT DOCUMENTS

| | | | |
|---|---|---|---|
| 2012/0038693 A1 | 2/2012 | Kang et al. | |
| 2014/0043352 A1 | 2/2014 | Damberg et al. | |
| 2016/0077419 A1* | 3/2016 | Sheng .................. | G03B 21/204 353/20 |
| 2016/0381329 A1 | 12/2016 | Damberg et al. | |
| 2020/0249492 A1* | 8/2020 | Maes ................. | G02B 27/1026 |

FOREIGN PATENT DOCUMENTS

| | | |
|---|---|---|
| JP | 2005-221629 | 8/2005 |
| JP | 2005-284058 | 10/2005 |
| JP | 2006018162 A | 1/2006 |
| JP | 2008164699 A | 7/2008 |
| JP | 2010-079156 | 4/2010 |
| JP | 2012-525789 | 10/2012 |
| JP | 2014-071131 | 4/2014 |
| JP | 5512798 B | 6/2014 |
| JP | 2017-054061 | 3/2017 |
| JP | 2017-142508 | 8/2017 |
| WO | WO 2018/025506 | 2/2018 |

OTHER PUBLICATIONS

Official Action for China Patent Application No. 201980047441.8, dated Nov. 16, 2021, 13 pages.

* cited by examiner

ILLUMINATION DEVICE AND PROJECTOR

CROSS REFERENCE TO RELATED APPLICATIONS

This application is a national stage application under 35 U.S.C. 371 and claims the benefit of PCT Application No. PCT/JP2019/026114 having an international filing date of 1 Jul. 2019, which designated the United States, which PCT application claimed the benefit of Japanese Patent Application No. 2018-138366 filed 24 Jul. 2018, the entire disclosures of each of which are incorporated herein by reference.

TECHNICAL FIELD

The present disclosure relates to an illumination device and a projector that make it possible to achieve an HDR (High Dynamic Range).

BACKGROUND ART

In recent years, in the field of video display, techniques of enhancing a dynamic range have been proposed, and particularly an HDR standard has attracted attention. The HDR standard is a video signal format that expands gradation representation of a low luminance part and achieves high peak luminance. The former signal format has allowed for luminance representation up to about 100 $cd/m^2$. Meanwhile, however, there has currently been a growing demand for several tenfold higher luminance representation. PTL 1 proposes a technique of enhancing the dynamic range, in an illumination device of a projector, by causing HDR light and SDR (Standard Dynamic Range) light to enter an integrator optical system for multiplexing.

CITATION LIST

Patent Literature

PTL 1: International Publication No. WO2018/025506

SUMMARY OF THE INVENTION

However, when multiplexing the HDR light and the SDR light in order to enhance the dynamic range, light utilization efficiency may be decreased.

It is desirable to provide an illumination device and a projector that achieve a high dynamic range and suppress a decrease in light utilization efficiency.

MEANS FOR SOLVING THE PROBLEM

An illumination device according to an embodiment of the present disclosure includes: a first light source unit that emits first light of a first wavelength band; a first spatial light modulator where the first light from the first light source unit enters; a second light source unit that emits second light of a second wavelength band; an integrator optical system including a first fly-eye lens where the second light from the second light source unit enters and generating illumination light for an illumination target on a basis of the first light having been modulated by the first spatial light modulator and on a basis of the second light from the second light source unit; and a multiplexing optical system that multiplexes the second light having entered the first fly-eye lens and the first light having been modulated by the first spatial light modulator, in an optical path between the first fly-eye lens and the illumination target.

A projector according to an embodiment of the present disclosure includes: an illumination device including a first spatial light modulator where first light of a first wavelength band enters; and a second spatial light modulator that modulates illumination light from the illumination device to generate a projection image on a basis of an image signal, in which the illumination device further includes a first light source unit that emits the first light of the first wavelength band, a second light source unit that emits second light of a second wavelength band, an integrator optical system including a first fly-eye lens where the second light from the second light source unit enters and generating illumination light for the second spatial light modulator on a basis of the first light having been modulated by the first spatial light modulator and on a basis of the second light from the second light source unit, and a multiplexing optical system that multiplexes the second light having entered the first fly-eye lens and the first light having been modulated by the first spatial light modulator, in an optical path between the first fly-eye lens and the illumination target.

In the illumination device or the projector according to respective embodiments of the present disclosure, the first light having been modulated by the first spatial light modulator and the second light having entered the first fly-eye lens of the integrator optical system are multiplexed in the optical path between the first fly-eye lens and the illumination target.

MODES FOR CARRYING OUT THE INVENTION

Hereinafter, description is given in detail of embodiments of the present disclosure with reference to the drawings. It is to be noted that the description is given in the following order.

1. First Embodiment (FIGS. 1 to 11)
   1.1 Configuration and Operation of Illumination Device and Projector according to First Embodiment
       1.1.1 Configuration and Operation of Entire Projector
       1.1.2 Configuration and Operation of Each Component of Projector
   1.2 Effects and Comparative Examples
2. Second Embodiment (FIGS. 12 to 16)
3. Third Embodiment (FIG. 17)
4. Fourth Embodiment (FIG. 18)
5. Fifth Embodiment (FIGS. 19 to 22)
6. Other Embodiments

1. First Embodiment

1.1 Configuration and Operation of Illumination Device and Projector According to First Embodiment

1.1.1 Configuration and Operation of Entire Projector

Figure 1:
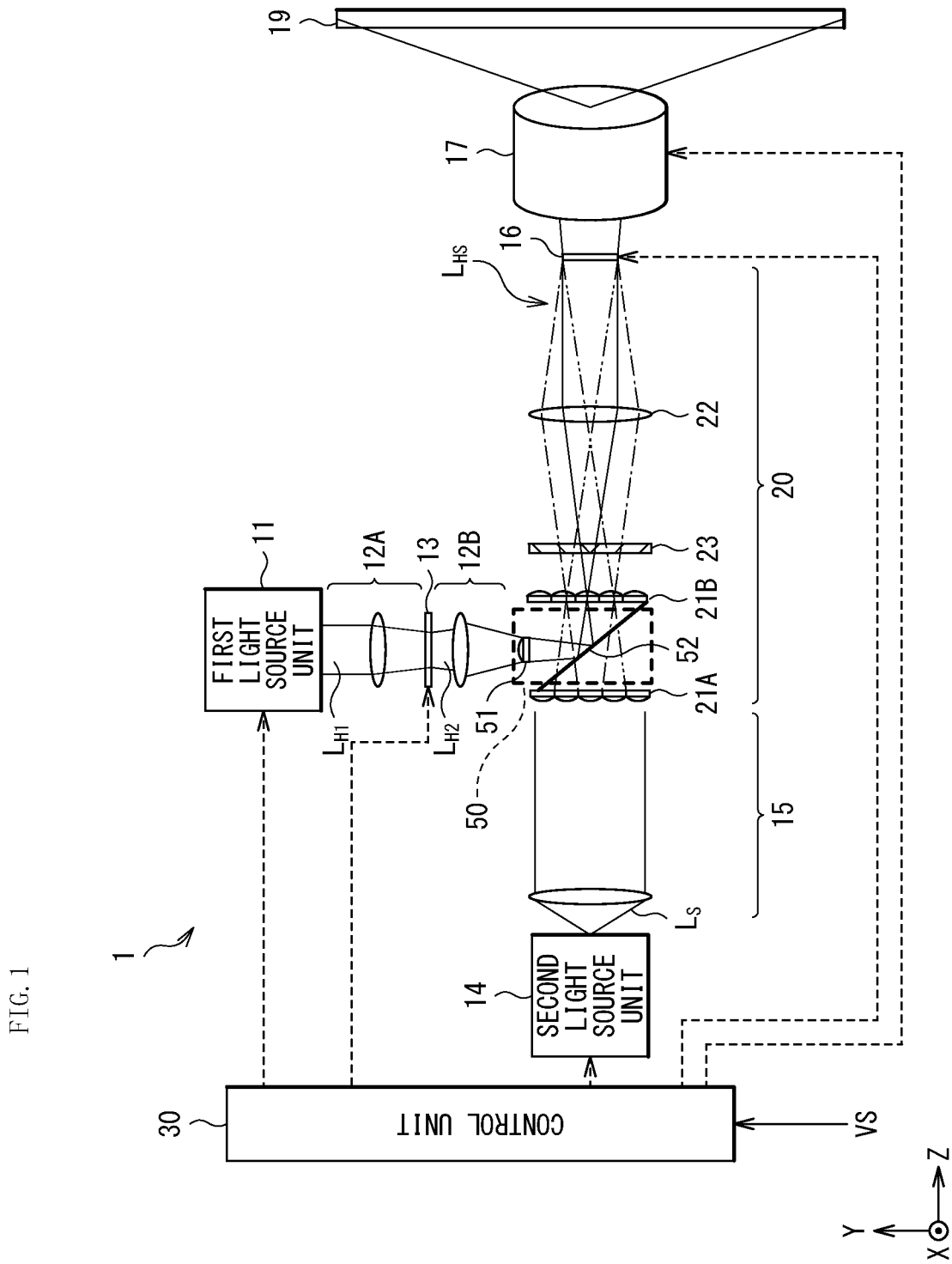
FIG. 1 is a configuration diagram schematically illustrating a configuration example of a projector according to a first embodiment of the present disclosure.

FIG. 1 schematically illustrates a configuration example of a projector 1 according to a first embodiment of the present disclosure. It is to be noted that description is given, in the first embodiment, by exemplifying a case of monochromatic display for simplicity of the description.

The projector 1 according to the first embodiment is, for example, a display apparatus that projects an image on a screen 19. The projector 1 is coupled, for example, to a computer such as a PC (personal computer) or an external image supply apparatus such as various image players via an I/F (interface), and performs projection onto the screen 19 on the basis of an image signal VS inputted to the I/F. It is to be noted that the configuration of the projector 1 described below is merely an example, and the projector of the present technology is not limited to such a configuration.

The projector 1 includes an illumination device provided with a first spatial light modulator 13, and a second spatial light modulator 16 that modulates illumination light from the illumination device to generate a projection image on the basis of the image signal VS. The second spatial light modulator 16 is an illumination target to be illuminated by the illuminating device. The projector 1 further includes a projection optical system 17 that projects the projection image generated by the second spatial light modulator 16 onto a projection plane, such as the screen 19, and a control unit 30 that controls the illumination device, the second spatial light modulator 16 and the projection optical system 17.

The illumination device includes a first light source unit 11, a first illumination optical system 12A, a second illumination optical system 12B, a first spatial light modulator 13, a second light source unit 14, a third illumination optical system 15, an integrator optical system 20, and a multiplexing optical system 50.

It is to be noted that, in FIG. 1, for example, an optical axis direction of the integrator optical system 20 is defined as a Z-direction. In addition, one direction orthogonal to the Z-direction is defined as an X-direction. In addition, a direction orthogonal to the Z-direction and the X-direction is defined as a Y-direction. The same applies to other subsequent drawings.

The integrator optical system 20 includes a pair of fly-eye lenses (a first fly-eye lens 21A and a second fly-eye lens 21B), a polarization conversion element 23, and a fourth illumination optical system 22.

The multiplexing optical system 50 includes a multiplexing lens 51 and a multiplexing mirror 52.

For example, an HDR signal is inputted as the image signal VS to the projector 1. The projector 1 divides the HDR signal into a signal of a high luminance region and a signal of a low luminance region, and generates an image of a high luminance region using at least HDR light $L_{H2}$ and generates an image of a low luminance region using at least SDR light $L_S$, out of the projection image generated in the second spatial light modulator 16. The HDR light $L_{H2}$ is generated by causing the first spatial light modulator 13 to modulate HDR light $L_{H1}$ from the first light source unit 11. This makes it possible to achieve a high dynamic range in a high luminance region and to suppress a decrease in light utilization efficiency in a portion other than the high luminance region.

The HDR light $L_{H2}$ from the first spatial light modulator 13 and the SDR light $L_S$ from the second light source unit 14 are multiplexed by the multiplexing optical system 50 and the integrator optical system 20 to generate integrated light (synthesized light) $L_{HS}$. The second spatial light modulator 16 is irradiated with the integrated light $L_{HS}$, as illumination light, including the HDR light $L_{H2}$ and the SDR light $L_S$.

1.1.2 Configuration and Operation of Each Component of Projector

The first light source unit 11 and the second light source unit 14 each include, for example, a solid-state light source such as a semiconducting laser (LD) or a light-emitting diode. The first light source unit 11 and the second light source unit 14 may each be configured by a light source using a wavelength conversion material such as a phosphor, or may be configured by a discharge lamp. Each of the first light source unit 11 and the second light source unit 14 may be configured by one solid-state light source, or may be configured by a plurality of solid-state light sources.

The first light source unit 11 emits the HDR light $L_{H1}$ as first light of a first wavelength band. The second light source unit 14 emits the SDR light $L_S$ as second light of a second wavelength band.

Figure 2:
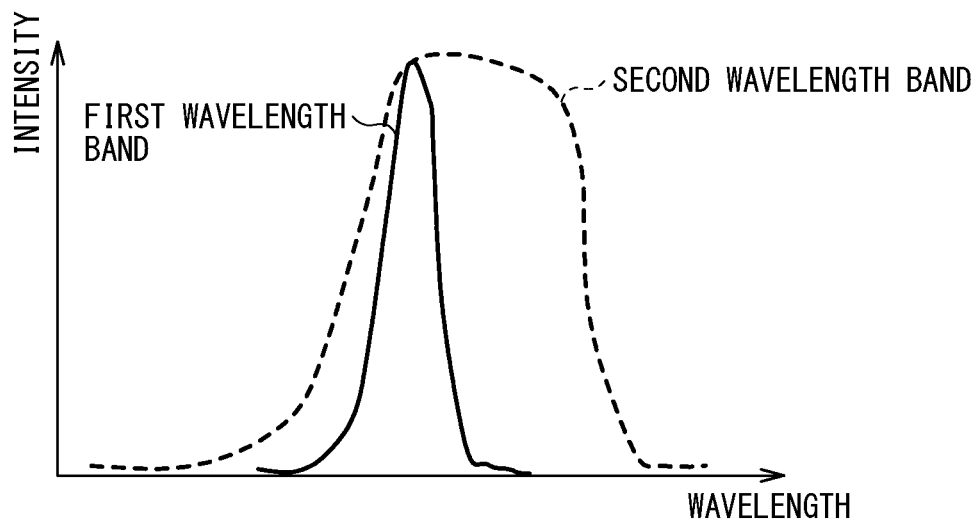
FIG. 2 is a characteristic diagram illustrating an example of spectral characteristics of first light of a first wavelength band and second light of a second wavelength band in the projector according to the first embodiment.

FIG. 2 illustrates an example of spectral characteristics of the first light (HDR light $L_{H1}$) of the first wavelength band and the second light (SDR light $L_S$) of the second wavelength band. As illustrated in FIG. 2, the first wavelength band is a band narrower than the second wavelength band. The second wavelength band includes the first wavelength band, and is a band wider than the first wavelength band.

Figure 3:
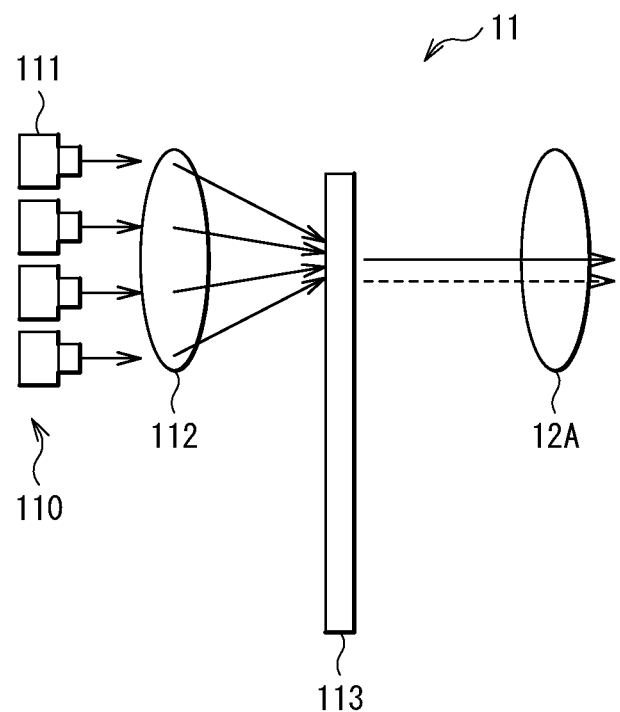
FIG. 3 is a configuration diagram schematically illustrating a configuration example of a first light source unit in the projector according to the first embodiment.

FIG. 3 schematically illustrates a configuration example of the first light source unit 11. As illustrated in FIG. 3, the first light source unit 11 may be configured to include an array light source 110 including a plurality of excitation light sources 111, an excitation optical system 112, and a wavelength conversion section 113. The wavelength conversion section 113 includes a wavelength conversion material that enables wavelength conversion of a narrow band such as QD (quantum dot). Using a blue laser as the excitation light source 111 allows for better cost efficiency. In addition, adopting the array light source 110 with arrayed blue lasers and using the excitation optical system 112 make it possible to achieve higher luminance of the first light source unit 11.

The first illumination optical system 12A is an optical system for guiding the HDR light $L_{H1}$ emitted from the first light source unit 11 to the first spatial light modulator 13. The first illumination optical system 12A is configured by, for example, a plurality of lenses or a single lens, etc. The first illumination optical system 12A is provided on an optical path between the first light source unit 11 and the first spatial light modulator 13.

The first spatial light modulator 13 performs intensity modulation or phase modulation of incident light. The first spatial light modulator 13 is configured by, for example, a transmissive liquid crystal panel. It is to be noted that the first spatial light modulator 13 may be configured by a reflective liquid crystal panel or a mirror device using a micromirror.

The HDR light $L_{H1}$ from the first light source unit 11 enters the first spatial light modulator 13 via the first illumination optical system 12A. The first spatial light modulator 13 modulates the HDR light $L_{H1}$ from the first light source unit 11 on the basis of a signal of a high luminance region included in the image signal VS. The first spatial light modulator 13 is provided on an optical path between the first illumination optical system 12A and the second illumination optical system 12B.

The second illumination optical system 12B is an optical system for guiding the HDR light $L_{H2}$ having been modulated by the first spatial light modulator 13 to the multiplexing optical system 50. The second illumination optical system 12B is configured by, for example, a plurality of lenses or a single lens.

The third illumination optical system 15 is an optical system for collimating the SDR light $L_S$ emitted from the second light source unit 14 and guiding the collimated SDR light $L_S$ to the integrator optical system 20. The third illumination optical system 15 is configured by, for example, a plurality of lenses or a single lens. The third illumination optical system 15 is provided on an optical path between the second light source unit 14 and the first fly-eye lens 21A of the integrator optical system 20.

The integrator optical system 20 generates illumination light for the second spatial light modulator 16 on the basis of the HDR light $L_{H2}$ having been modulated by the first spatial light modulator 13 and the SDR light $L_S$ emitted from the second light source unit 14. The second spatial light modulator 16 is irradiated with synthesized light (integrated light $L_{HS}$), as illumination light, of the HDR light $L_{H2}$ and the SDR light $L_S$ generated by the multiplexing optical system 50 and the integrator optical system 20.

In the integrator optical system 20, each of the first fly-eye lens 21A and the second fly-eye lens 21B is configured by a plurality of lens elements. A focal distance of each lens element of the first fly-eye lens 21A and a focal distance of each lens element of the second fly-eye lens 21B are substantially equal to each other. A distance between the first fly-eye lens 21A and the second fly-eye lens 21B is the same as a value of the focal distance, for example. The distance between the first fly-eye lens 21A and the second fly-eye lens 21B may be a value near the value of the focal distance. The second fly-eye lens 21B is provided on an optical path between the first fly-eye lens 21A and the second spatial light modulator 16, and more particularly between the first fly-eye lens 21A and the polarization conversion element 23.

The polarization conversion element 23 is a P-S polarization conversion element that converts incident light into specific linearly polarized light (e.g., P-polarized light or S-polarized light). The polarization conversion element 23 is provided on an optical path between the second fly-eye lens 21B and the second spatial light modulator 16, and more particularly between the second fly-eye lens 21B and the fourth illumination optical system 22.

The fourth illumination optical system 22 is provided for guiding the synthesized light (integrated light $L_{HS}$) of the HDR light $L_{H2}$ and the SDR light $L_S$ to the second spatial light modulator 16. The fourth illumination optical system 22 is provided on an optical path between the polarization conversion element 23 and the second spatial light modulator 16.

The SDR light $L_S$ emitted from the second light source unit 14 passes through the third illumination optical system 15, for example, and thereafter enters the first fly-eye lens 21A. The SDR light $L_S$ is uniformized together with the HDR light $L_{H2}$ in the integrator optical system 20, and is irradiated to the second spatial light modulator 16.

The second spatial light modulator 16 is configured by, for example, a transmissive liquid crystal panel that enables intensity modulation of incident light. The second spatial light modulator 16 modulates the illumination light (integrated light $L_{HS}$) from the integrator optical system 20 on the basis of the image signal VS to generate a projection image. The second spatial light modulator 16 is provided on an optical path between the integrator optical system 20 and the projection optical system 17. It is to be noted that the second spatial light modulator 16 may be configured by a reflective liquid crystal panel or a mirror device using a micromirror.

The projection optical system 17 enlarges and projects the projection image generated by the second spatial light modulator 16 onto a projection plane such as the screen 19. The projection optical system 17 is configured by, for example, a plurality of lenses or a single lens.

Configuration Example of Multiplexing Optical System 50

Figure 4:
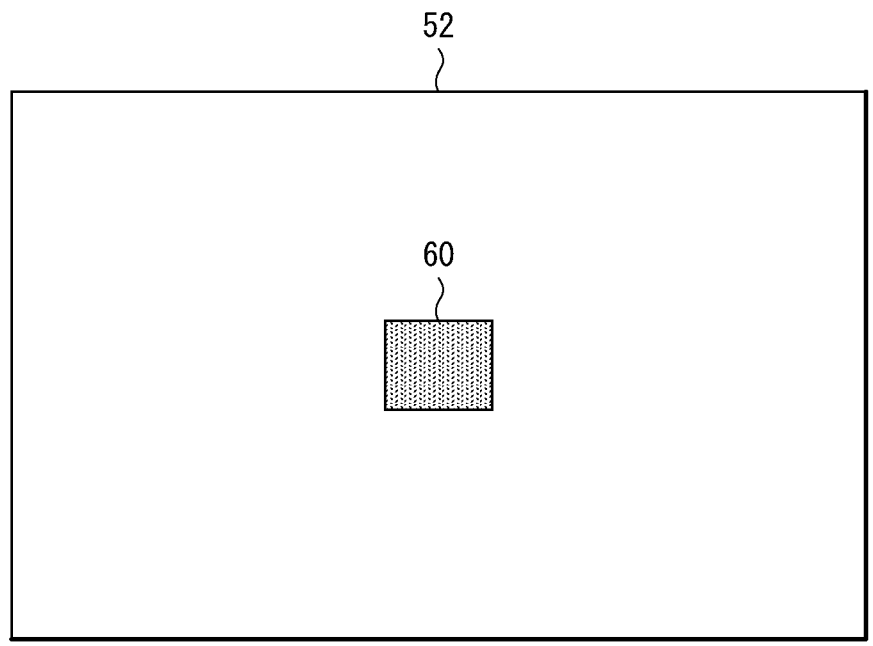
FIG. 4 is a plan view schematically illustrating a configuration example of a multiplexing mirror in the projector according to the first embodiment.
Figure 5:
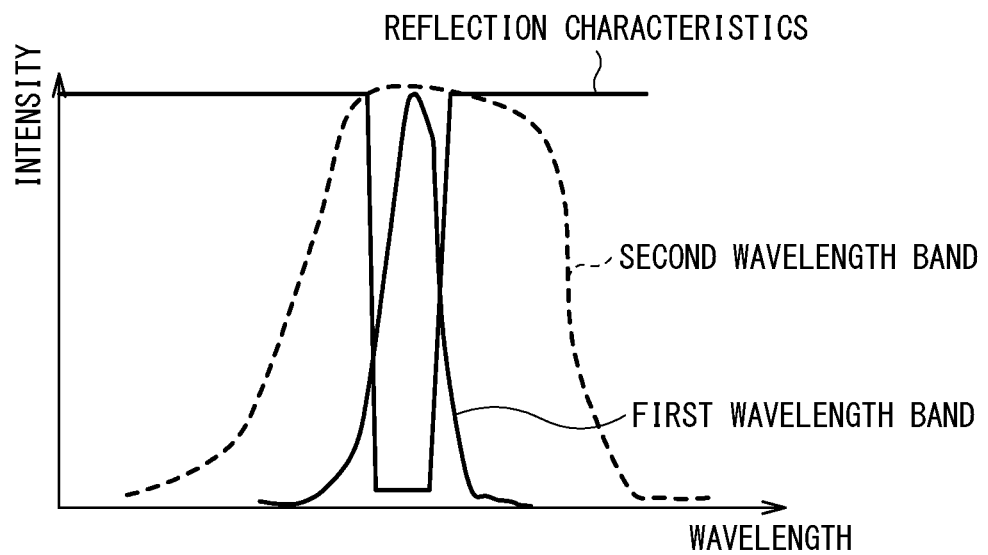
FIG. 5 is a characteristic diagram illustrating an example of reflection characteristics of the multiplexing mirror in the projector according to the first embodiment.
Figure 6:
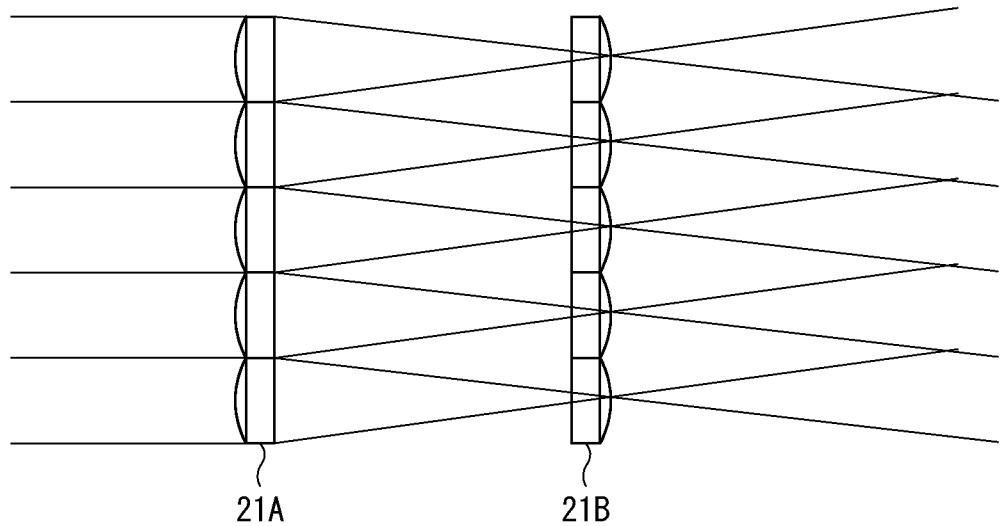
FIG. 6 is an explanatory diagram illustrating a passing state of a light ray passing through a first fly-eye lens and a second fly-eye lens in the projector according to the first embodiment.

FIG. 4 schematically illustrates a configuration example of the multiplexing mirror 52 in the multiplexing optical system 50. FIG. 5 illustrates an example of reflection characteristics of the multiplexing mirror 52. FIG. 6 illustrates a passing state of a light ray passing through the first fly-eye lens 21A and the second fly-eye lens 21B in the integrator optical system 20.

The multiplexing optical system 50 is provided for multiplexing the SDR light $L_S$ having entered the first fly-eye lens 21A in the integrator optical system 20 and the HDR light $L_{H2}$ having been modulated by the first spatial light modulator 13, in the optical path between the first fly-eye lens 21A and the second spatial light modulator 16. In the projector 1 according to the first embodiment, the multiplexing optical system 50 multiplexes the SDR light $L_S$ having entered the first fly-eye lens 21A and the HDR light $L_{H2}$ having been modulated by the first spatial light modulator 13, in an optical path between the first fly-eye lens 21A and the second fly-eye lens 21B in the integrator optical system 20.

The multiplexing optical system 50 includes the multiplexing lens 51 that causes the HDR light $L_{H2}$ having been modulated by the first spatial light modulator 13 to enter the optical path between the first fly-eye lens 21A in the integrator optical system 20 and the second spatial light modulator 16. In the projector 1 according to the first embodiment, the multiplexing lens 51 causes the HDR light $L_{H2}$ having been modulated by the first spatial light modulator 13 to enter the optical path between the first fly-eye lens 21A and the second fly-eye lens 21B in the integrator optical system 20. The multiplexing lens 51 is provided on an optical path between the second illumination optical system 12B and the multiplexing mirror 52.

The multiplexing lens 51 includes one lens element corresponding to at least one lens element in the first fly-eye lens 21A in the integrator optical system 20, and is configured to be paired with at least one lens element in the second fly-eye lens 21B.

The multiplexing optical system 50 includes at least one multiplexing mirror 52 disposed in the optical path between the first fly-eye lens 21A and the second spatial light modulator 16. In the projector 1 according to the first embodiment, the multiplexing mirror 52 is provided on the optical path between the first fly-eye lens 21A and the second fly-eye lens 21B in the integrator optical system 20.

The multiplexing mirror 52 includes at least one reflection part 60 that reflects the HDR light $L_{H2}$ having been modulated by the first spatial light modulator 13. The multiplexing mirror 52 has a structure in which, for example, a region on which at least the HDR light $L_{H2}$ is incident (a part to be multiplexed with the SDR light $L_S$) functions as a reflective element to the HDR light $L_{H2}$, and the other region has a function of transmitting the SDR light $L_S$. For example, as illustrated in FIG. 4, the multiplexing mirror 52 has a structure in which a reflective coating is applied as the reflection part 60 to a region, on a substrate that transmits at least the SDR light $L_S$, on which at least the HDR light $L_{H2}$ is incident. It is to be noted that the multiplexing mirror 52 may be a reflective mirror of a structure of only a part corresponding to the reflection part 60.

In a case where the HDR light $L_{H2}$ of the first wavelength band and the SDR light $L_S$ of the second wavelength band have respective spectral characteristics as illustrated in FIG. 2, it is desirable that the reflection part 60 in the multiplexing mirror 52 have a reflective function for the first wavelength band and a transmissive function for a band other than the first wavelength band in the second wavelength band, as in reflection characteristics illustrated in FIG. 5. This allows the SDR light $L_S$ of a wavelength portion different from that of the HDR light $L_{H2}$ to be transmitted through the reflection part 60, thus making it possible to achieve higher efficiency of the SDR light $L_S$.

Here, as illustrated in FIG. 6, light entering the first fly-eye lens 21A has a light flux diameter that becomes smaller as the light travels toward a subsequent stage (side of the second fly-eye lens 21B), between the first fly-eye lens 21A and the second fly-eye lens 21B. Therefore, positioning the reflection part 60 on side close to the second fly-eye lens 21B (side of smaller light flux diameter) between the first fly-eye lens 21A and the second fly-eye lens 21B increases a degree of design freedom of the multiplexing mirror 52 and makes it easier to prevent a decrease in light efficiency, which is thus preferable.

Configuration Example of Control Unit 30

Figure 7:
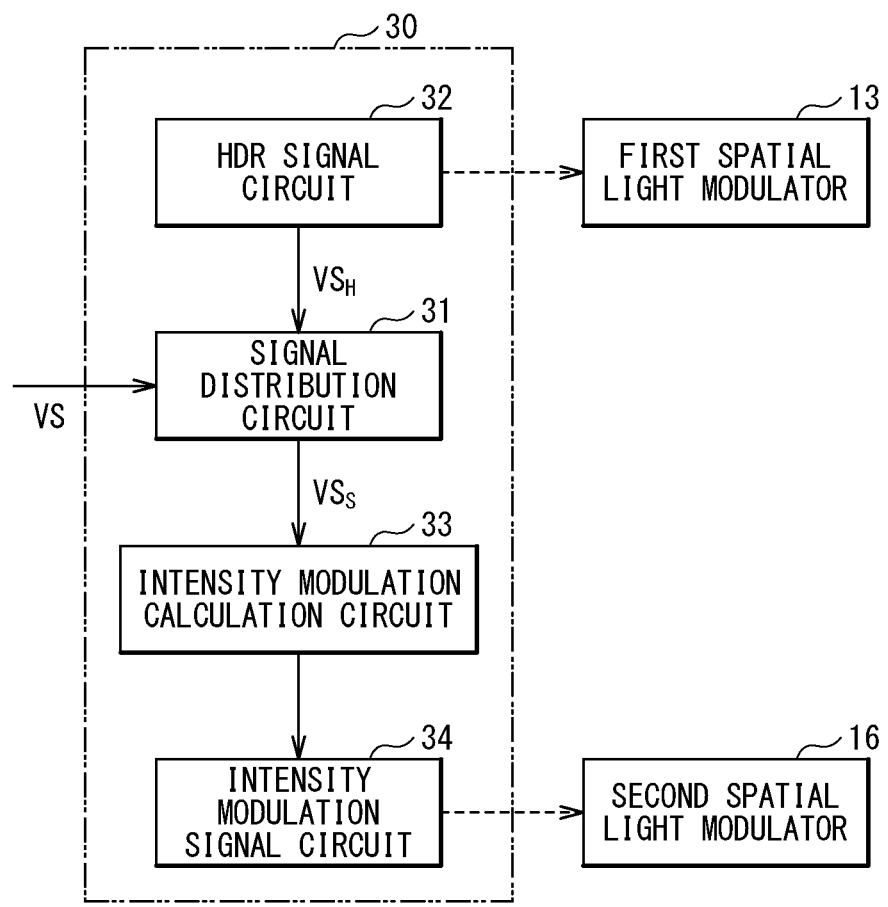
FIG. 7 is a block diagram schematically illustrating a configuration example of a main part of a control unit of the projector according to the first embodiment.

FIG. 7 schematically illustrates a configuration example of a main part of the control unit 30.

As illustrated in FIG. 7, the control unit 30 includes, for example, a signal distribution circuit 31, an HDR signal circuit 32, an intensity modulation calculation circuit 33, and an intensity modulation signal circuit 34.

For example, an HDR signal including a signal $VS_H$ of a high luminance region is inputted as the image signal VS to the signal distribution circuit 31. The signal distribution circuit 31 distributes the image signal VS into the signal $VS_H$ of the high luminance region and another signal $VS_S$. Of the image signal VS, the signal $VS_H$ of the high luminance region is sent to the HDR signal circuit 32. The other signal $VS_S$ is sent to the intensity modulation calculation circuit 33. The other signal $VS_S$ includes information for the second spatial light modulator 16 to generate an image based on the image signal VS in consideration of the signal $VS_H$ of the high luminance region.

The HDR signal circuit 32 generates a drive signal for driving the first spatial light modulator 13 on the basis of the signal $VS_H$ of the high luminance region from the signal distribution circuit 31. This cause the first spatial light modulator 13 to be driven by a drive signal based on the signal $VS_H$ of the high luminance region and to modulate the HDR light $L_{H1}$ from the first light source unit 11 to generate the HDR light $L_{H2}$ corresponding to the image of the high luminance region.

The intensity modulation calculation circuit 33 calculates a signal to be sent to the intensity modulation signal circuit 34 on the basis of the signal $VS_S$ from the signal distribution circuit 31, a light emission state of the second light source unit 14, and the like. The intensity modulation signal circuit 34 generates a drive signal for driving the second spatial light modulator 16 on the basis of the signal sent from the intensity modulation calculation circuit 33. This allows the second spatial light modulator 16 to generate an image of the low luminance region using at least the SDR light $L_S$ as a portion of the projection image. Meanwhile, as described above, the second spatial light modulator 16 is irradiated with the synthesized light (integrated light $L_{HS}$) of the HDR light $L_{H2}$ and the SDR light $L_S$, and thus the projection image generated by the second spatial light modulator 16 also includes an image of the high luminance region. This allows for generation of a projection image with a high dynamic range.

Additionally, the control unit 30 may include a light source control section for controlling the first light source unit 11 and the second light source unit 14. In addition, the control unit 30 may include, for example, a lens control section or the like that controls a lens position or the like inside the projection optical system 17.

Modification Example of First Embodiment

Figure 8:
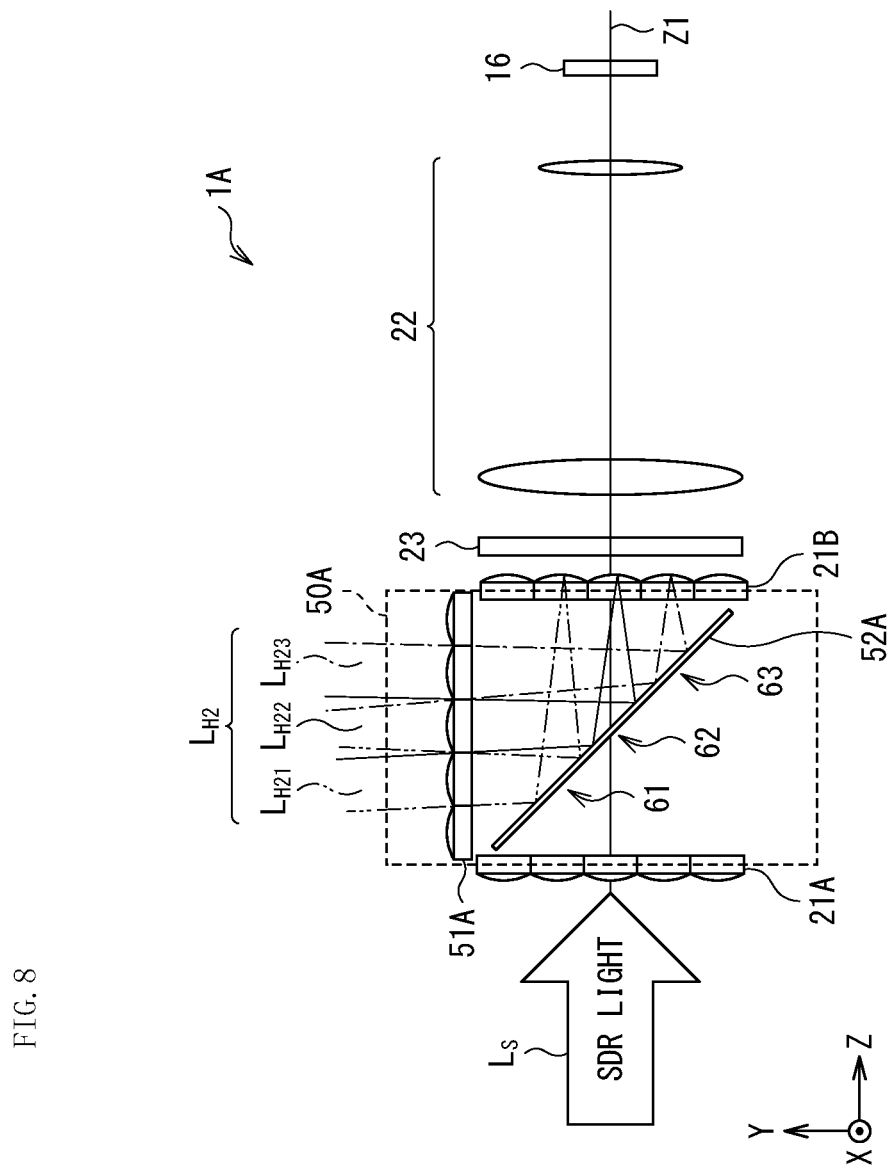
FIG. 8 is a configuration diagram schematically illustrating a configuration example of a main part of a projector according to a modification example of the first embodiment.
Figure 9:
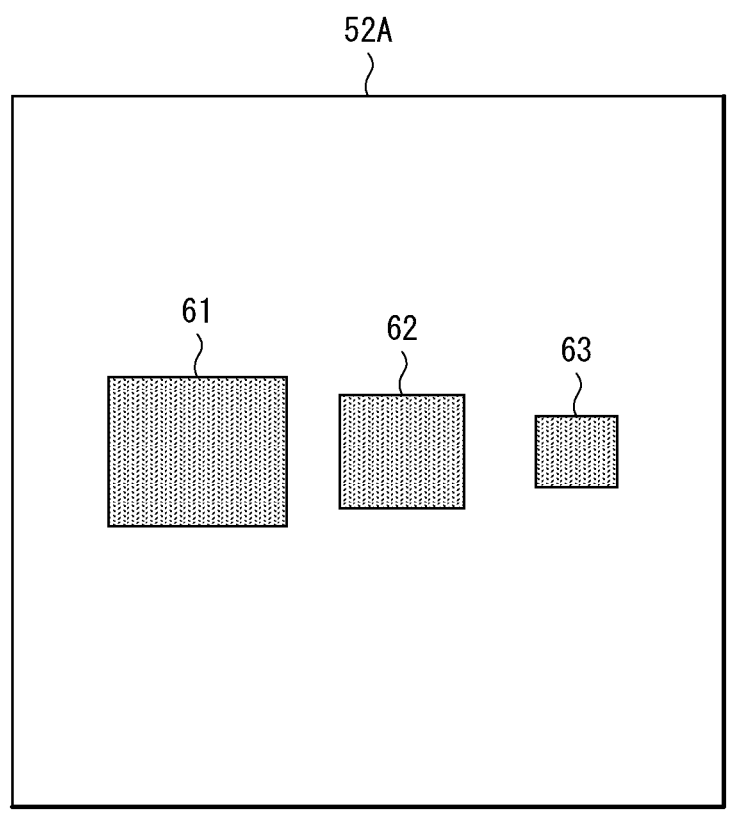
FIG. 9 is a plan view schematically illustrating a configuration example of a multiplexing mirror in the projector according to the modification example of the first embodiment.

FIG. 8 schematically illustrates a configuration example of a main part of a projector 1A according to a modification example of the first embodiment. FIG. 9 schematically illustrates a configuration example of a multiplexing mirror 52A in the projector 1A according to the modification example of the first embodiment.

The projector 1A according to the present modification example includes a multiplexing optical system 50A instead of the multiplexing optical system 50 in the projector 1 according to the first embodiment.

The multiplexing optical system 50A in the modification example includes a multiplexing fly-eye lens 51A and the multiplexing mirror 52A.

In the projector 1 according to the first embodiment, as illustrated in FIGS. 1 and 4, the multiplexing lens 51 includes, in the multiplexing optical system 50, one lens element corresponding to one lens element in the first fly-eye lens 21A in the integrator optical system 20, for example. In addition, as illustrated in FIG. 4, the multiplexing mirror 52 includes the one reflection part 60, and the multiplexing mirror 52 is disposed to allow the one reflection part 60 to be positioned at a part corresponding to an optical path of the one lens element in the first fly-eye lens 21A in the integrator optical system 20.

In contrast, the multiplexing optical system 50A in the modification example includes the multiplexing fly-eye lens 51A corresponding to the plurality of lens elements in the first fly-eye lens 21A. This allows the multiplexing fly-eye lens 51A to generate HDR light beams $L_{H21}$, $L_{H22}$, and $L_{H23}$, i.e., a plurality of light fluxes divided from the incident HDR light $L_{H2}$. It is to be noted that FIG. 8 exemplifies an example in which the multiplexing fly-eye lens 51A includes three lens elements and the light flux of the HDR light $L_{H2}$ is divided into three; however, the number of lens elements of the multiplexing fly-eye lens 51A and the number of divisions of the light fluxes may be each two. In addition, the number of the lens elements of the multiplexing fly-eye lens 51A and the number of divisions of the light fluxes may be each four or more.

The multiplexing mirror 52A has a plurality of reflection parts 61, 62, and 63 according to the number of divisions of the light fluxes divided by the multiplexing fly-eye lens 51A. The multiplexing mirror 52A is disposed to allow the plurality of reflection parts 61, 62, and 63 to be positioned on respective optical paths of the plurality of HDR light beams $L_{H21}$, $L_{H22}$, and $L_{H23}$ generated by the multiplexing fly-eye lens 51A. The plurality of reflection parts 61, 62, and 63 reflect, respectively, the plurality of HDR light beams $L_{H21}$, $L_{H22}$, and $L_{H23}$ generated by the multiplexing fly-eye lens 51A toward a plurality of lens elements of the second fly-eye lens 21B. The structure and reflection characteristics of each of the plurality of reflection parts 61, 62, and 63 are substantially similar to those of the reflection part 60 in the multiplexing optical system 50. It is to be noted that the plurality of HDR light beams $L_{H21}$, $L_{H22}$, and $L_{H23}$ generated by the multiplexing fly-eye lens 51A are incident on the multiplexing mirror 52A at different positions in the Z-direction with respect to an optical axis Z1 of the integrator optical system 20. For this reason, the light flux diameters of the plurality of HDR light beams $L_{H21}$, $L_{H22}$, and $L_{H23}$ that are incident on the multiplexing mirror 52A are of different respective sizes depending on positions of incidence. The sizes of the plurality of reflection parts 61, 62, and 63 are sizes corresponding to the light flux diameters of the plurality of HDR light beams $L_{H21}$, $L_{H22}$, and $L_{H23}$ that are incident on the multiplexing mirror 52A, and thus are sizes different from each other. It is to be noted that optical path lengths of respective optical paths of the plurality of HDR light beams $L_{H21}$, $L_{H22}$, and $L_{H23}$ from the multiplexing fly-eye lens 51A through the multiplexing mirror 52A to the second fly-eye lens 21B are substantially the same as each other. However, the optical path lengths of these optical paths may be different from each other.

It is possible, for the projector 1A according to the present the modification example, to multiplex the plurality of HDR light beams $L_{H21}$, $L_{H22}$, and $L_{H23}$ and the SDR light $L_S$, in a plurality of optical paths between the first fly-eye lens 21A and the second fly-eye lens 21B of the integrator optical system 20.

Other configurations and operations are substantially similar to those of the projector 1 according to the first embodiment.

1.2 Effects and Comparative Examples

As described above, according to the projector 1 according to the first embodiment, the first light (HDR light $L_{H2}$) having been modulated by the first spatial light modulator 13 and the second light (SDR light $L_S$) having entered the first fly-eye lens of the integrator optical system are multiplexed in the optical path between the first fly-eye lens 21A and the second spatial light modulator 16 as the illumination target, thus making it possible to achieve a high dynamic range and to suppress a decrease in the light utilization efficiency.

According to the projector 1 of the first embodiment, the HDR light $L_{H2}$ and the SDR light $L_S$ are multiplexed on the optical path of the lens element at the central part instead of the lens element at the periphery of the first fly-eye lens 21A, as compared with a first comparative example (FIG. 10) described later, thereby making it possible to improve optical efficiency of the HDR light $L_{H2}$, which, in other words, leads to an improvement in power efficiency.

In addition, according to the projector 1 of the first embodiment, the HDR light $L_{H2}$ in a narrow band and the SDR light $L_S$ in a band wider than the HDR light $L_{H2}$ are multiplexed to generate the projection image, thus leading to an improvement in image quality. For example, it is possible to display an image based on the HDR signal only by the HDR light $L_{H2}$ using only a highly coherent light source such as a laser. In this case, there is a possibility that the optical efficiency and the power efficiency may be higher than the case of generating a projection image through the division into the HDR light $L_{H2}$ and the SDR light $L_S$, in some occasions. However, using only the highly coherent light source having an extremely narrow wavelength band and high directivity, as in the laser, produces a speckle, resulting in poor image quality. Meanwhile, using a light source having a wide wavelength band such as fluorescence as the SDR light $L_S$ reduces an influence of the speckle, making the speckle less likely to be visually recognized when generating and projecting a projection image by multiplexing the HDR light $L_{H2}$ and the SDR light $L_S$. This makes it possible to achieve an improvement in the image quality.

In addition, by using, as the first light source unit 11 that emits the HDR light $L_{H1}$, the excitation light source 111 such as a blue laser and the wavelength conversion element (wavelength conversion section 113) as illustrated in FIG. 3, it is possible to achieve high cost efficiency. Although it may be possible to achieve the HDR light $L_{H2}$ and the SDR light $L_S$ by using only a laser, as for green and red lasers, EO efficiency is low and the unit price is high, thus causing higher costs. Achieving an optical configuration in which a blue laser is used as the excitation light source 111 and wavelength conversion is adopted to facilitate use of green light and red light allows for better cost efficiency.

Projectors According to Comparative Examples

Description is given here, as a comparative example, of a configuration of a projector corresponding to a technique disclosed in PTL 1 (WO2018/025506).

Figure 10:
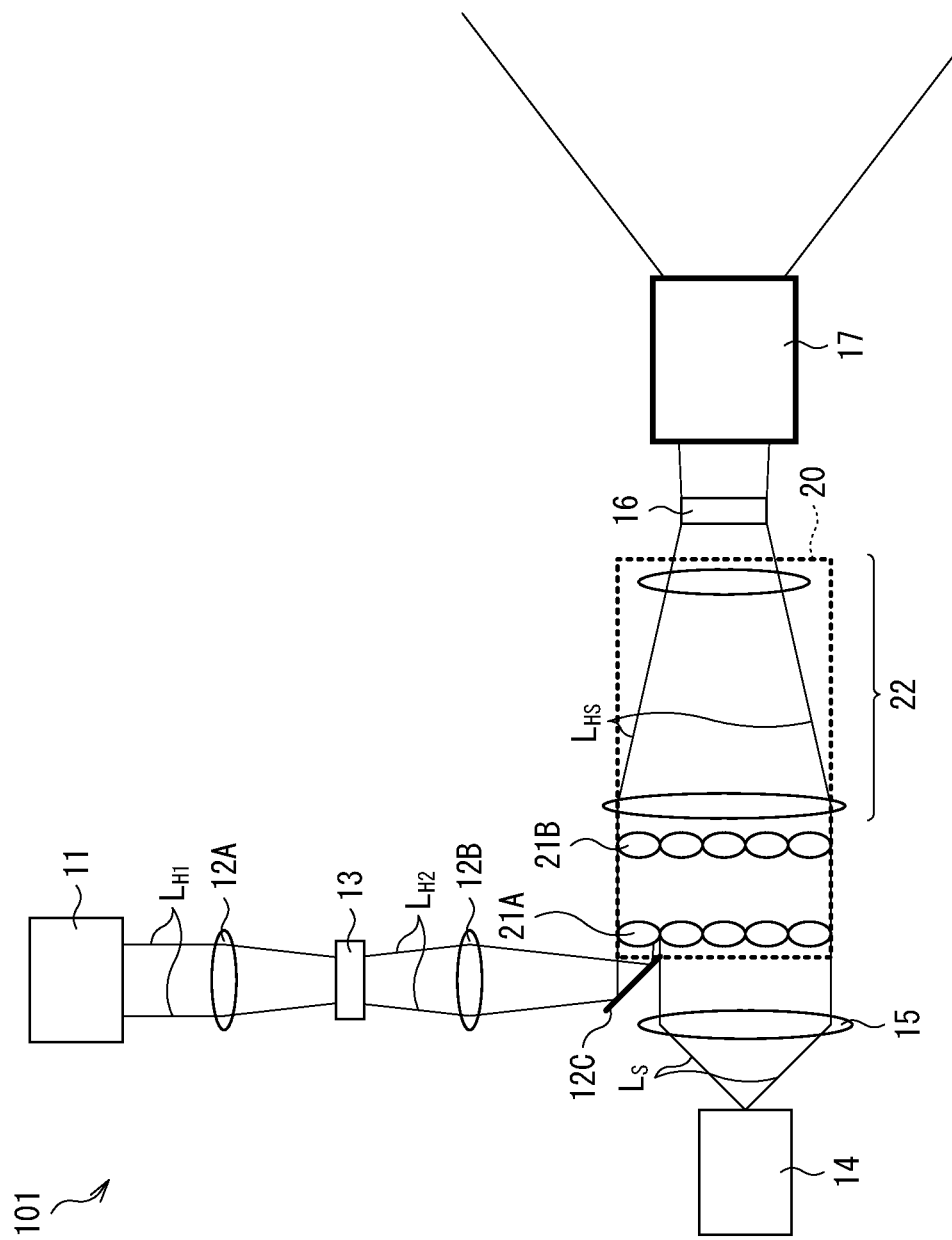
FIG. 10 is a configuration diagram illustrating an overview of a projector according to a first comparative example with respect to the projector according to the first embodiment.
Figure 11:
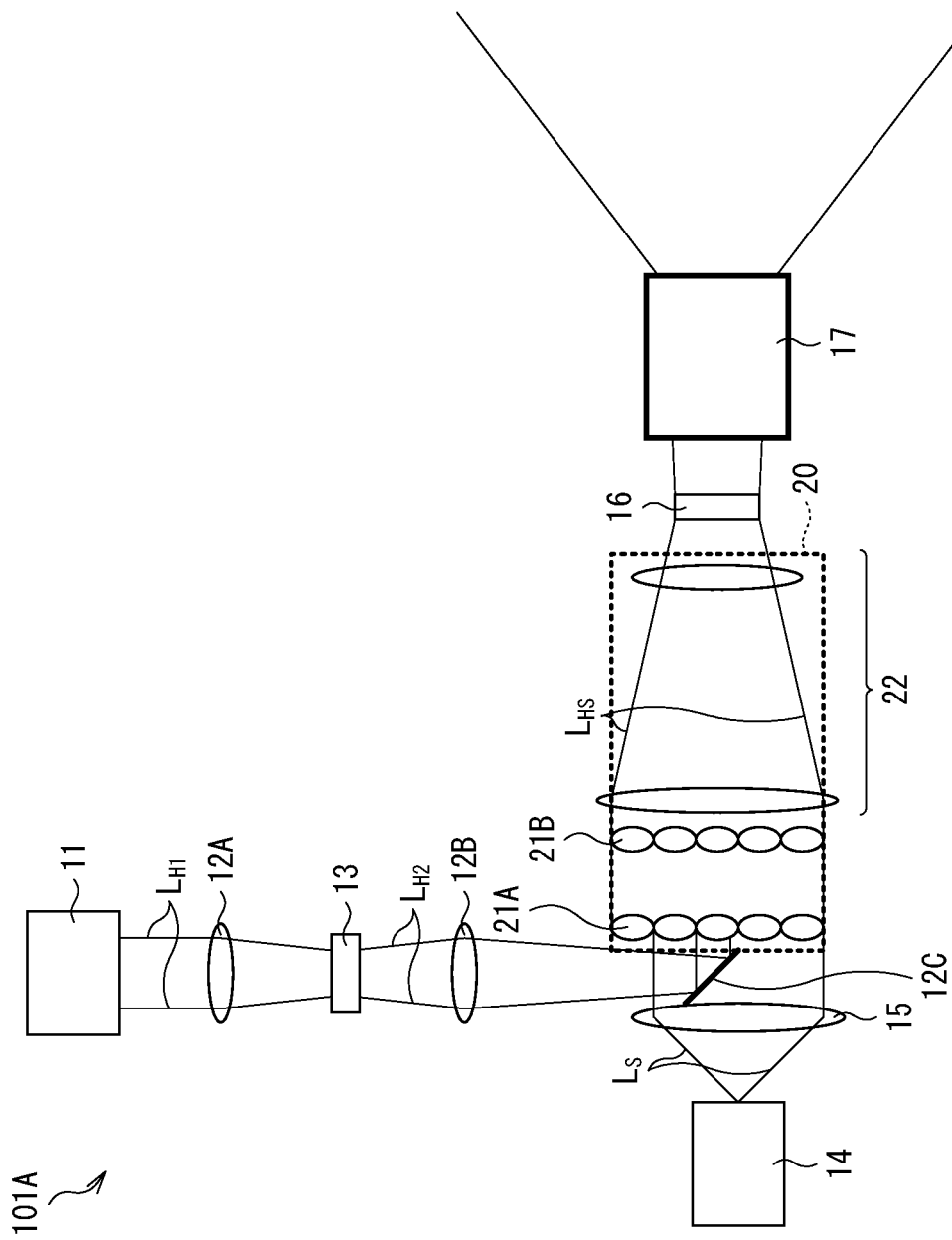
FIG. 11 is a configuration diagram illustrating an overview of a projector according to a second comparative example with respect to the projector according to the first embodiment.

FIG. 10 illustrates an overview of a projector 101 according to a first comparative example with respect to the projector 1 according to the first embodiment. FIG. 11 illustrates an overview of a projector 101A according to a second comparative example with respect to the projector 1 according to the first embodiment. It is to be noted that, in the following, components substantially the same as those of the illumination device and the projector 1 according to the foregoing first embodiment are denoted by the same reference numerals, and the description thereof is omitted where appropriate.

The projector 101 according to the first comparative example and the projector 101A according to the second comparative example are each provided with an optical path conversion element 12C instead of the multiplexing optical system 50 in the projector 1 according to the first embodiment. The optical path conversion element 12C is configured by a mirror, or the like, for example.

In the projectors 101 and 101A according to the first and second comparative examples, the optical path conversion element 12C is disposed at a stage preceding the first fly-eye lens 21A in the integrator optical system 20, and the HDR light $L_{H2}$ having been modulated by the first spatial light modulator 13 is caused to enter the first fly-eye lens 21A to thereby multiplex the HDR light $L_{H2}$ and the SDR light $L_S$ from the second light source unit 14 in the integrator optical system 20.

In the projector 101 according to the first comparative example illustrated in FIG. 10, the optical path conversion element 12C causes the HDR light $L_{H2}$ to enter an outermost lens element of the first fly-eye lens 21A in order to prevent a decrease in the efficiency of the SDR light $L_S$. In the case of this configuration, there is a drop in a peripheral light amount in the integrator optical system 20 and the projection optical system 17, thus leading to deteriorated optical efficiency of the HDR light $L_{H2}$. In particular, in a case of using, as the projection optical system 17, a projection lens with a large drop in the peripheral light amount such as an ultra-short focal lens, light in each of the peripheries of the first fly-eye lens 21A and the second fly-eye lens 21B may substantially discarded, or luminance unevenness and chromaticity unevenness may occur significantly in a projection image in some occasions.

In contrast, disposing the optical path conversion element 12C in the vicinity of the center of the first fly-eye lens 21A as in the projector 101A according to the second comparative example illustrated in FIG. 11 allows the HDR light $L_{H2}$ and the SDR light $L_S$ to be multiplexed in the vicinity of the center of the first fly-eye lens 21A, which makes it possible to prevent a drop in the peripheral light amount of the HDR light $L_{H2}$. However, the optical path conversion element 12C and the structural part holding the optical path conversion element 12C block light passing through the vicinity of the center of the SDR light $L_S$ from the second light source unit 14, thus leading to a decrease in the efficiency of the SDR light $L_S$.

In addition, in both of the projectors 101 and 101A according to the first and second comparative examples, the size of the optical path conversion element 12C needs to be substantially similar to that of a light flux entering at least one of lens elements of the first fly-eye lens 21A. In contrast, in the projector 1 according to the first embodiment, as illustrated in FIGS. 1 and 6, the reflection part 60 of the multiplexing mirror 52 is able to be positioned at a position where the light flux diameter becomes smaller between the first fly-eye lens 21A and the second fly-eye lens 21B, thus enabling the reflection part 60 to be configured to be smaller than the optical path conversion element 12C in the first and second comparative examples.

It is to be noted that the effects described herein are merely illustrative and non-limiting, and may have other effects. The same applies to the effects of the following other embodiments.

2. Second Embodiment

Next, description is given of an illumination device and a projector according to a second embodiment of the present disclosure. It is to be noted that, in the following, substantially the same components as those of the illumination device and the projector according to the foregoing first embodiment are denoted by the same reference numerals, and description thereof is omitted where appropriate.

In the second embodiment, description is given of an illumination device and a projector corresponding to color display.

Figure 12:
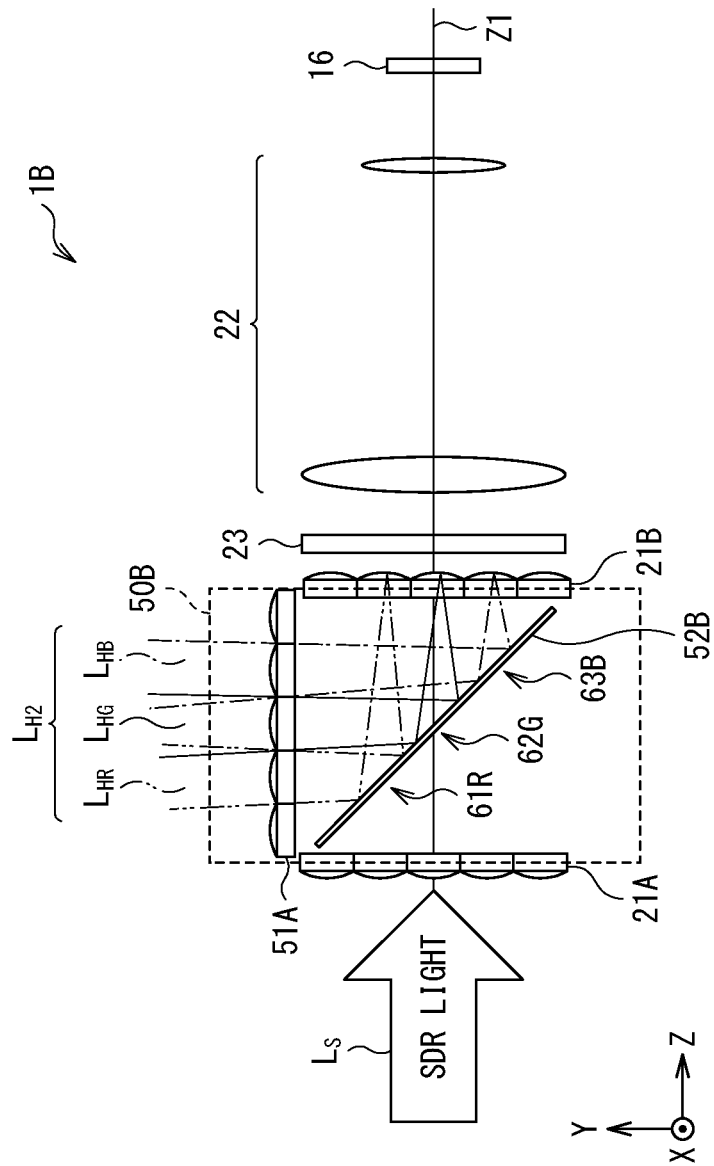
FIG. 12 is a configuration diagram schematically illustrating a configuration example of a main part of a projector according to a second embodiment.
Figure 13:
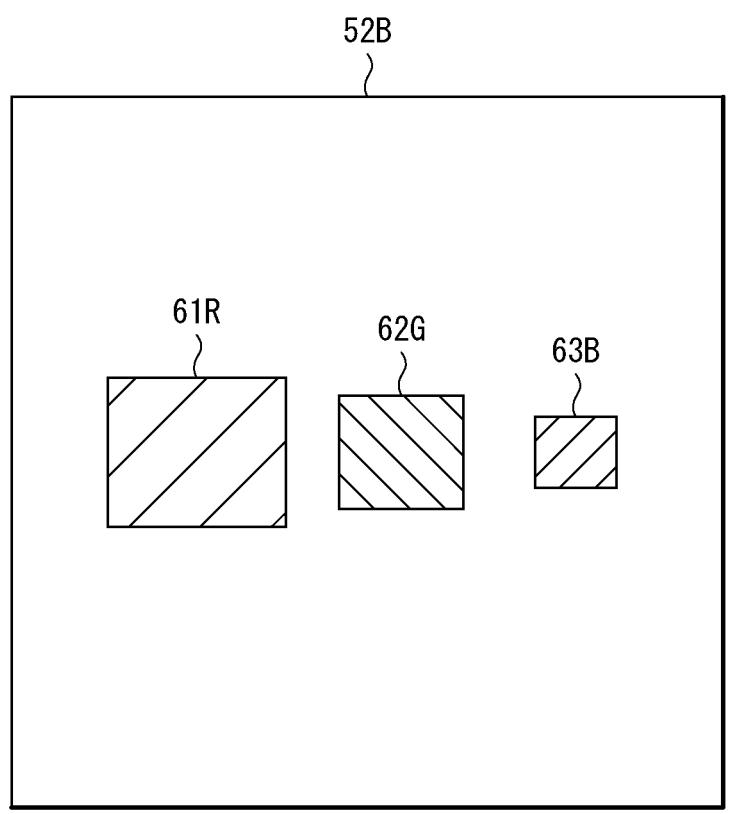
FIG. 13 is a plan view schematically illustrating a configuration example of a multiplexing mirror in the projector according to the second embodiment.

FIG. 12 schematically illustrates a configuration example of a main part of a projector 1B according to the second embodiment. FIG. 13 schematically illustrates a configuration example of a multiplexing mirror 52B in the projector 1B according to the second embodiment.

The projector 1B according to the second embodiment includes a multiplexing optical system 50B instead of the multiplexing optical system 50 in the projector 1 according to the first embodiment.

The multiplexing optical system 50B in the projector 1B includes the multiplexing fly-eye lens 51A and the multiplexing mirror 52B.

The multiplexing optical system 50B includes the multiplexing fly-eye lens 51A corresponding to the plurality of lens elements in the first fly-eye lens 21A, substantially similarly to the projector 1A (FIGS. 8 and 9) according to the modification example of the first embodiment. The HDR light $L_{H2}$ including a plurality of color light beams (a red HDR light $L_{HR}$, a green HDR light $L_{HG}$, and a blue HDR light $L_{HB}$) enters the multiplexing optical system 50B. Mutually different color light beams (red HDR light $L_{HR}$, green HDR light $L_{HG}$, and blue HDR light $L_{HB}$) enter the respective lens elements of the multiplexing fly-eye lens 51A.

The multiplexing mirror 52B includes a plurality of reflection parts (a red reflection part 61R, a green reflection part 62G, and a blue reflection part 63B) that reflect respective color light beams having been modulated by the first spatial light modulator 13 at spatially different positions for respective colors. The multiplexing mirror 52B is disposed to allow the red reflection part 61R, the green reflection part 62G, and the blue reflection part 63B to be positioned on respective optical paths of the red HDR light $L_{HR}$, the green HDR light $L_{HG}$, and the blue HDR light $L_{HB}$ from the multiplexing fly-eye lens 51A. The red reflection part 61R, the green reflection part 62G, and the blue reflection part 63B reflect, respectively, the red HDR light $L_{HR}$, the green HDR light $L_{HG}$, and the blue HDR light $L_{HB}$ from the multiplexing fly-eye lens 51A toward a plurality of lens elements of the second fly-eye lens 21B.

As illustrated in FIG. 13, the multiplexing mirror 52B has a structure in which, for example, reflective coatings that reflect respective color light beams are applied, as the red reflection part 61R, the green reflection part 62G, and the blue reflection part 63B, to a region, on the substrate that transmits at least the SDR light $L_S$, on which at least the red HDR light $L_{HR}$, the green HDR light $L_{HG}$, and the blue HDR light $L_{HB}$ are incident.

It is to be noted that the red HDR light $L_{HR}$, the green HDR light $L_{HG}$, and the blue HDR light $L_{HB}$ from the multiplexing fly-eye lens 51A are incident on the multiplexing mirror 52B at spatially different positions in the Z-direction with respect to the optical axis Z1 of the integrator optical system 20. For this reason, the light flux diameters of respective color light beams that are incident on the multiplexing mirror 52B are of different respective sizes depending on positions of incidence. The sizes of the red reflection part 61R, the green reflection part 62G, and the blue reflection part 63B correspond to the light flux diameters of the respective color light beams incident on the multiplexing mirror 52B, and thus are sizes different from each other. It is to be noted that the optical path lengths of optical paths of the respective color light beams from the multiplexing fly-eye lens 51A through the multiplexing mirror 52B to the second fly-eye lens 21B are substantially the same as each other. However, the optical path lengths of these optical paths may be different from each other.

In this manner, in the multiplexing optical system 50B, the respective color light beams having been modulated by the first spatial light modulator 13 are multiplexed with the SDR light $L_S$ having entered the first fly-eye lens 21A at mutually different positions in the optical path between the first fly-eye lens 21A and the second spatial light modulator 16.

Other configurations, operations, and effects may be substantially similar to those of the illumination device and the projector 1B according to the foregoing first embodiment.

First Modification Example of Second Embodiment

Figure 14:
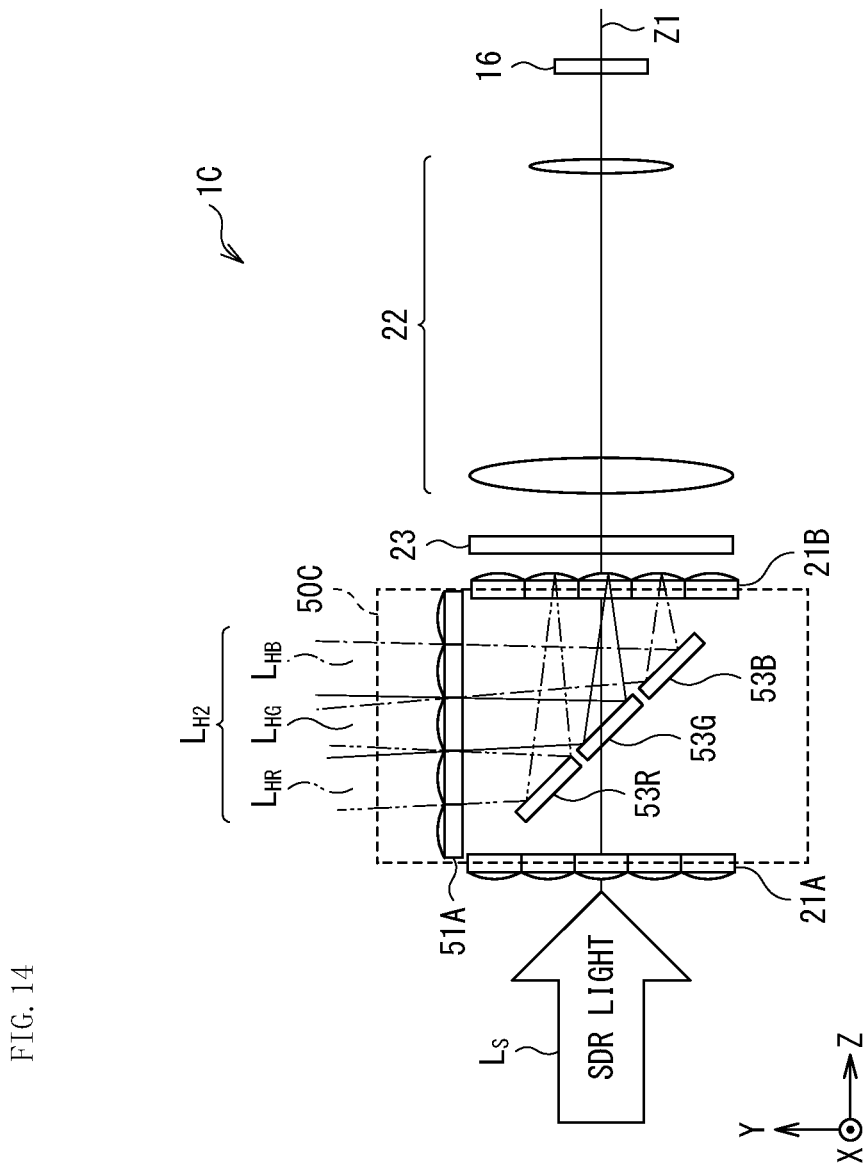
FIG. 14 is a configuration diagram schematically illustrating a configuration example of a main part of a projector according to a first modification example of the second embodiment.

FIG. 14 schematically illustrates a configuration example of a main part of a projector 1C according to a first modification example of the second embodiment.

The projector 1C according to the first modification example includes a multiplexing optical system 50C instead of the multiplexing optical system 50B in the projector 1B according to the second embodiment.

The multiplexing optical system 50C in the first modification example includes a plurality of multiplexing mirrors (a red multiplexing mirror 53R, a green multiplexing mirror 53G, and a blue multiplexing mirror 53B) that reflect respective color light beams, instead of the multiplexing mirror 52B in the multiplexing optical system 50B.

The red multiplexing mirror 53R, the green multiplexing mirror 53G, and the blue multiplexing mirror 53B has respective sizes corresponding to the red reflection part 61R, the green reflection part 62G, and the blue reflection part 63B in the multiplexing optical system 50B. In addition, the red multiplexing mirror 53R, the green multiplexing mirror 53G, and the blue multiplexing mirror 53B are disposed, respectively, at positions corresponding to the red reflection part 61R, the green reflection part 62G, and the blue reflection part 63B in the multiplexing optical system 50B.

The red multiplexing mirror 53R, the green multiplexing mirror 53G, and the blue multiplexing mirror 53B may be each configured by a reflective mirror or a dichroic mirror that reflects each incident color light beam.

Other configurations, operations, and effects may be substantially similar to those of the illumination device and the projector 1B according to the foregoing second embodiment.

Second Modification Example of Second Embodiment

Figure 15:
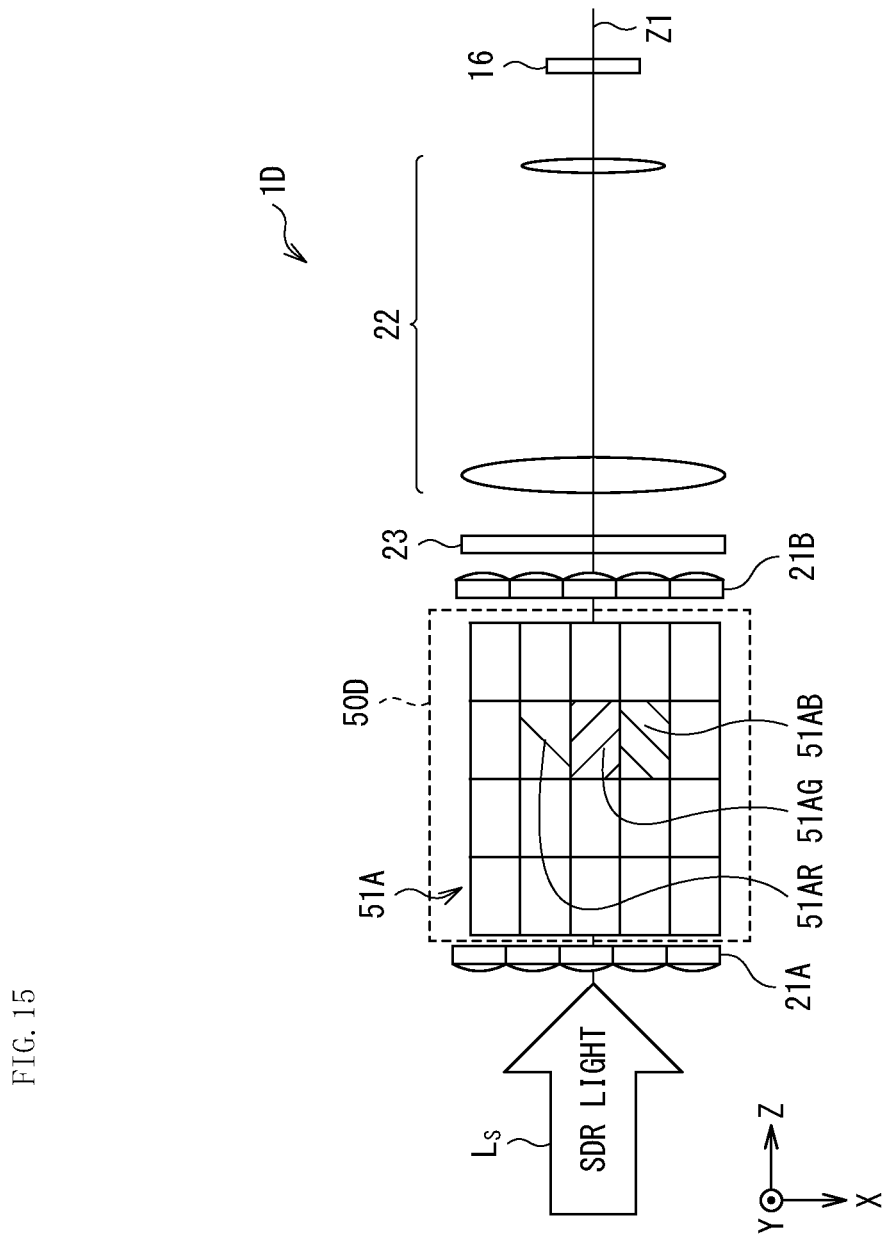
FIG. 15 is a configuration diagram schematically illustrating a configuration example of a main part of a projector according to a second modification example of the second embodiment.
Figure 16:
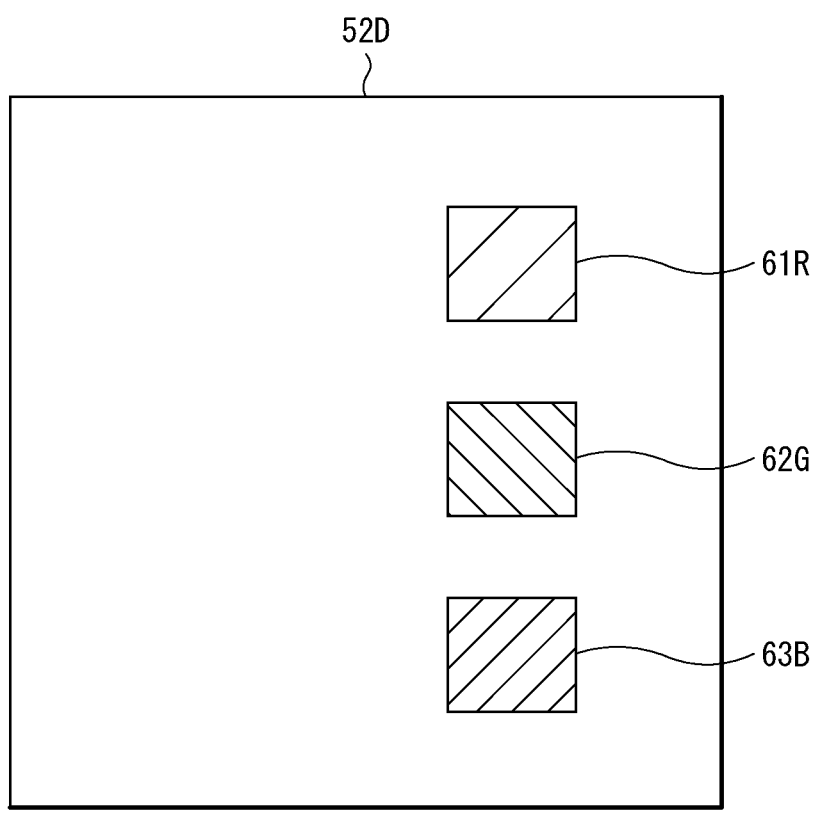
FIG. 16 is a plan view schematically illustrating a configuration example of a multiplexing mirror in the projector according to the second modification example of the second embodiment.

FIG. 15 schematically illustrates a configuration example of a main part of a projector 1D according to a second modification example of the second embodiment. FIG. 16 schematically illustrates a configuration example of a multiplexing mirror 52D in the projector 1D according to the second modification example of the second embodiment.

The projector 1D according to the second modification example includes a multiplexing optical system 50D instead of the multiplexing optical system 50B in the projector 1B according to the second embodiment.

The multiplexing optical system 50D in the second modification example includes the multiplexing mirror 52D instead of the multiplexing mirror 52B in the multiplexing optical system 50B.

The plurality of color light beams (red HDR light $L_{HR}$, green HDR light $L_{HG}$, and blue HDR light $L_{HB}$) enter the multiplexing fly-eye lens 51A of the multiplexing optical system 50D in the second modification example from a direction different by 90° from that in the multiplexing optical system 50B (FIG. 12). That is, in the multiplexing fly-eye lens 51A, a plurality of color light beams enter a plurality of lens elements (a red lens element 51AR, a green lens element 51AG, and a blue lens element 51AB) aligned in a direction (X-direction) orthogonal to the optical axis Z1 of the integrator optical system 20 in a Z-X plane in FIG. 15.

The multiplexing mirror 52D includes a plurality of reflection parts (red reflection part 61R, green reflection part 62G, and blue reflection part 63B) that reflect respective color light beams having been modulated by the first spatial light modulator 13 at spatially different positions for respective colors. The multiplexing mirror 52D is disposed to allow the red reflection part 61R, the green reflection part 62G, and the blue reflection part 63B to be positioned on respective optical paths of the red HDR light $L_{HR}$, the green HDR light $L_{HG}$, and the blue HDR light $L_{HB}$ from the multiplexing fly-eye lens 51A. The red reflection part 61R, the green reflection part 62G, and the blue reflection part 63B reflect, respectively, the red HDR light $L_{HR}$, the green HDR light $L_{HG}$, and the blue HDR light $L_{HB}$ from the multiplexing fly-eye lens 51A toward a plurality of lens elements of the second fly-eye lens 21B.

It is to be noted that, unlike the multiplexing mirror 52B (FIGS. 12 and 13), the red HDR light $L_{HR}$, the green HDR light $L_{HG}$, and the blue HDR light $L_{HB}$ are incident on the multiplexing mirror 52D of the second modification example at substantially the same position in the Z-direction with respect to the optical axis Z1 of the integrator optical system 20. For this reason, the light flux diameters of respective color light beams that are incident on the multiplexing mirror 52D are of substantially the same size. The sizes of the red reflection part 61R, the green reflection part 62G, and the blue reflection part 63B are sizes corresponding to the light flux diameters of the respective color light beams incident on the multiplexing mirror 52D, and thus are sizes substantially the same as each other. It is to be noted that the optical path lengths of optical paths of the respective color light beams from the multiplexing fly-eye lens 51A through the multiplexing mirror 52D to the second fly-eye lens 21B are substantially the same as each other. However, the optical path lengths of these optical paths may be different from each other Other configurations, operations, and effects may be substantially similar to those of the illumination device and the projector 1B according to the foregoing second embodiment.

3. Third Embodiment

Next, description is given of an illumination device and a projector according to a third embodiment of the present disclosure. It is to be noted that, in the following, substantially the same components as those of the illumination device and the projector according to the foregoing first or second embodiment are denoted by the same reference numerals, and description thereof is omitted where appropriate.

Figure 17:
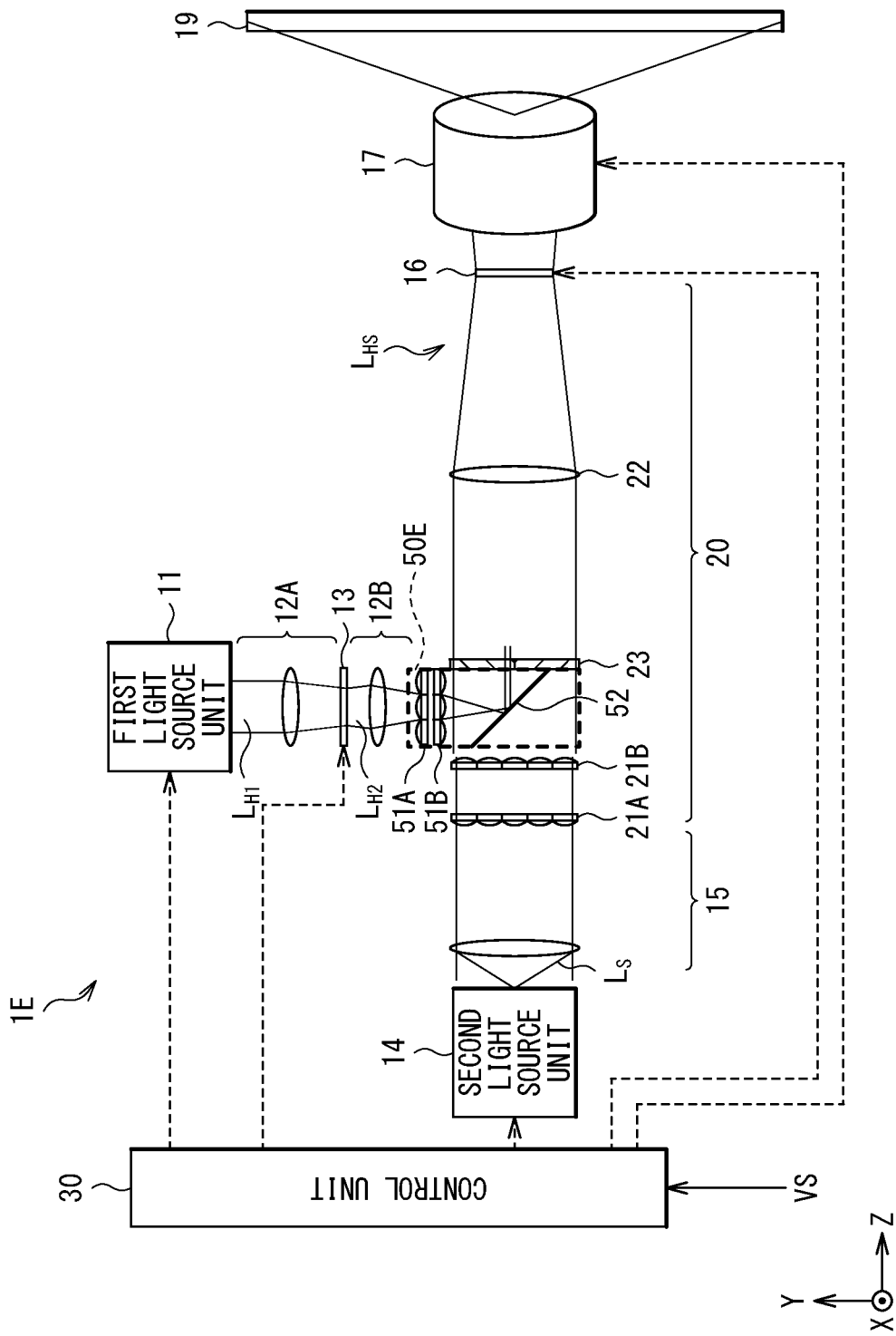
FIG. 17 is a configuration diagram schematically illustrating a configuration example of a projector according to a third embodiment.

FIG. 17 schematically illustrates a configuration example of a projector 1E according to the third embodiment.

The projector 1E according to the third embodiment includes a multiplexing optical system 50E instead of the multiplexing optical system 50 in the projector 1 according to the first embodiment.

The multiplexing optical system 50E multiplexes the SDR light $L_S$ having entered the first fly-eye lens 21A in the integrator optical system 20 and the HDR light $L_{H2}$ having been modulated by the first spatial light modulator 13, in an optical path between the second fly-eye lens 21B and the second spatial light modulator 16. More specifically, the multiplexing optical system 50E multiplexes the SDR light $L_S$ having entered the first fly-eye lens 21A and the HDR light $L_{H2}$ having been modulated by the first spatial light modulator 13, in an optical path between the second fly-eye lens 21B and the polarization conversion element 23 in the integrator optical system 20.

The multiplexing optical system 50E includes a pair of multiplexing fly-eye lenses (multiplexing fly-eye lenses 51A and 51B) corresponding to the pair of fly-eye lenses (first fly-eye lens 21A and second fly-eye lens 21B) in the integrator optical system 20, instead of the multiplexing lens 51 of the multiplexing optical system 50 in the first embodiment. The multiplexing fly-eye lenses 51A and 51B cause the HDR light $L_{H2}$ having been modulated by the first spatial light modulator 13 to enter the optical path between the second fly-eye lens 21B and the polarization conversion element 23 in the integrator optical system 20.

In addition, the multiplexing optical system 50E includes the multiplexing mirror 52 having a structure similar to that of the multiplexing optical system 50 in the first embodiment. However, in the multiplexing optical system 50E, the position where the multiplexing mirror 52 is disposed is different from that of the first embodiment; the multiplexing mirror 52 is disposed on the optical path between the second fly-eye lens 21B and the polarization conversion element 23.

According to the projector 1E of the third embodiment, it is possible to reduce a distribution (light flux diameter) of the HDR light $L_{H2}$ on the multiplexing mirror 52 as compared with the case where the multiplexing mirror 52 is disposed immediately after the first fly-eye lens 21A, thus making it easier to prevent a decrease in the efficiency of the SDR light $L_S$.

Other configurations, operations, and effects may be substantially similar to those of the illumination device and the projector 1 according to the foregoing first embodiment or the illumination device and the projector 1B according to the foregoing second embodiment.

4. Fourth Embodiment

Next, description is given of an illumination device and a projector according to a fourth embodiment of the present disclosure. It is to be noted that, in the following, substantially the same components as those of the illumination device and the projector according to any of the foregoing first to third embodiments are denoted by the same reference numerals, and description thereof is omitted where appropriate.

Figure 18:
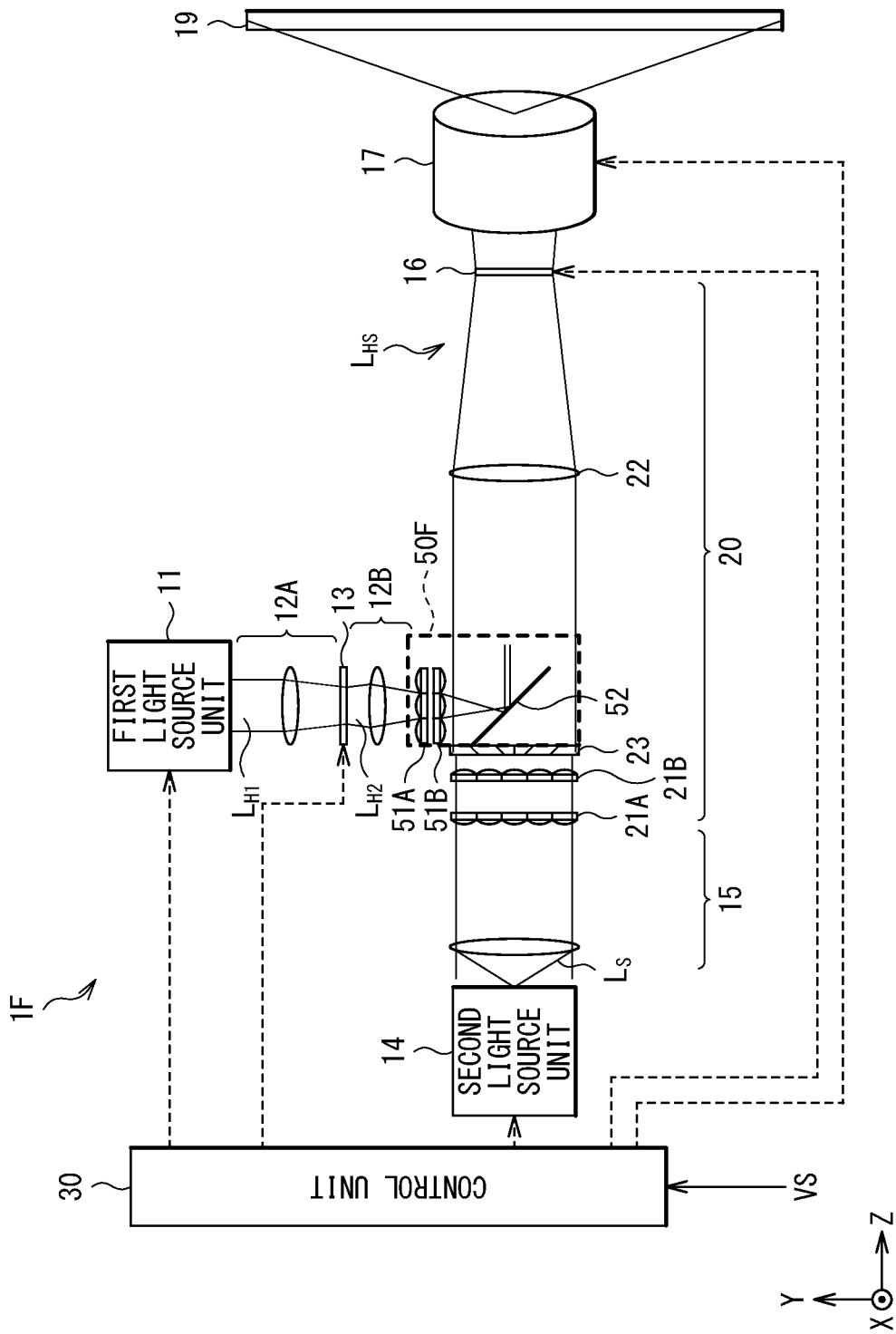
FIG. 18 is a configuration diagram schematically illustrating a configuration example of a projector according to a fourth embodiment.

FIG. 18 schematically illustrates a configuration example of a projector 1F according to the fourth embodiment.

The projector 1F according to the fourth embodiment includes a multiplexing optical system 50F instead of the multiplexing optical system 50 in the projector 1 according to the first embodiment.

The multiplexing optical system 50F multiplexes the SDR light $L_S$ having entered the first fly-eye lens 21A in the integrator optical system 20 and the HDR light $L_{H2}$ having been modulated by the first spatial light modulator 13, in an optical path between the second fly-eye lens 21B and the second spatial light modulator 16. More specifically, the multiplexing optical system 50F multiplexes the SDR light $L_S$ having entered the first fly-eye lens 21A and the HDR light $L_{H2}$ having been modulated by the first spatial light modulator 13, in an optical path between the polarization conversion element 23 in the integrator optical system 20 and the second spatial light modulator 16.

The multiplexing optical system 50F includes a pair of multiplexing fly-eye lenses (multiplexing fly-eye lenses 51A and 51B) corresponding to the pair of fly-eye lenses (first fly-eye lens 21A and second fly-eye lens 21B) in the integrator optical system 20, instead of the multiplexing lens 51 of the multiplexing optical system 50 in the first embodiment. The multiplexing fly-eye lenses 51A and 51B cause the HDR light $L_{H2}$ having been modulated by the first spatial light modulator 13 to enter the optical path between the polarization conversion element 23 in the integrator optical system 20 and the second spatial light modulator 16.

In addition, the multiplexing optical system 50F includes the multiplexing mirror 52 having a structure similar to that of the multiplexing optical system 50 in the first embodiment. However, in the multiplexing optical system 50F, the position where the multiplexing mirror 52 is disposed is different from that of the first embodiment; the multiplexing mirror 52 is disposed on the optical path between the polarization conversion element 23 and the second spatial light modulator 16.

According to the projector 1F of the fourth embodiment, it is possible to reduce a distribution (light flux diameter) of the HDR light $L_{H2}$ on the multiplexing mirror 52 as compared with the case where the multiplexing mirror 52 is disposed immediately after the first fly-eye lens 21A, thus making it easier to prevent a decrease in the efficiency of the SDR light $L_S$.

Other configurations, operations, and effects may be substantially similar to those of the illumination device and the projector 1 according to the foregoing first embodiment or the illumination device and the projector 1B according to the foregoing second embodiment.

5. Fifth Embodiment

Next, description is given of an illumination device and a projector according to a fifth embodiment of the present disclosure. It is to be noted that, in the following, substantially the same components as those of the illumination device and the projector according to any of the foregoing first to fourth embodiments are denoted by the same reference numerals, and description thereof is omitted where appropriate.

In each of the first to fourth embodiments, the configuration example is referred to, in which the first light (HDR light $L_{H2}$) having been modulated by the first spatial light modulator 13 is reflected, and the second light (SDR light $L_S$) having entered the first fly-eye lens 21A is transmitted, in the multiplexing mirror of the multiplexing optical system. However, a configuration may also be adopted, in which a relationship between the reflection and the transmission in the multiplexing mirror is reversed between the first light and the second light.

Figure 19:
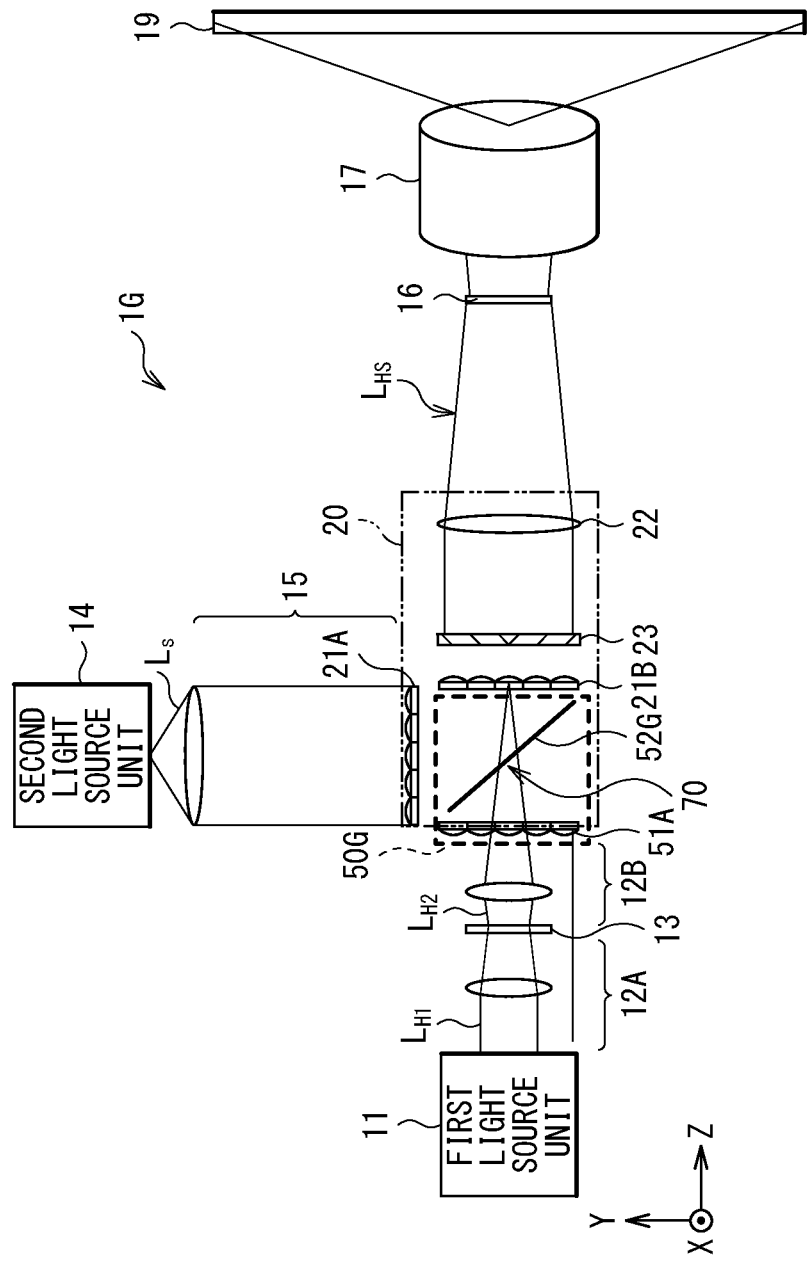
FIG. 19 is a configuration diagram schematically illustrating a configuration example of a projector according to a fifth embodiment.

FIG. 19 schematically illustrates a configuration example of a projector 1G according to the fifth embodiment.

The projector 1G according to the fifth embodiment adopts an optical path arrangement with a positional relationship in which the optical path of the HDR light $L_{H1}$ and the optical path of the SDR light $L_S$ are interchanged. In addition, the projector 1G according to the fifth embodiment includes a multiplexing optical system 50G instead of the multiplexing optical system 50 in the projector 1 according to the first embodiment.

The multiplexing optical system 50G includes the multiplexing fly-eye lens 51A and a multiplexing mirror 52G. The multiplexing mirror 52G includes at least one transmission part 70 that transmits the HDR light $L_{H2}$ having been modulated by the first spatial light modulator 13. The multiplexing mirror 52G has a structure in which, for example, a region other than at least the transmission part 70 functions as a reflective element to the SDR light $L_S$, and a region of the transmission part 70 has a function of transmitting the HDR light $L_{H2}$. In the multiplexing mirror 52G, the region other than the transmission part 70 may be a reflective mirror or a dichroic mirror that reflects the SDR light $L_S$.

Other configurations, operations, and effects may be substantially similar to those of the illumination device and the projector according to any of the foregoing first to fourth embodiments.

First Modification Example of Fifth Embodiment

Figure 20:
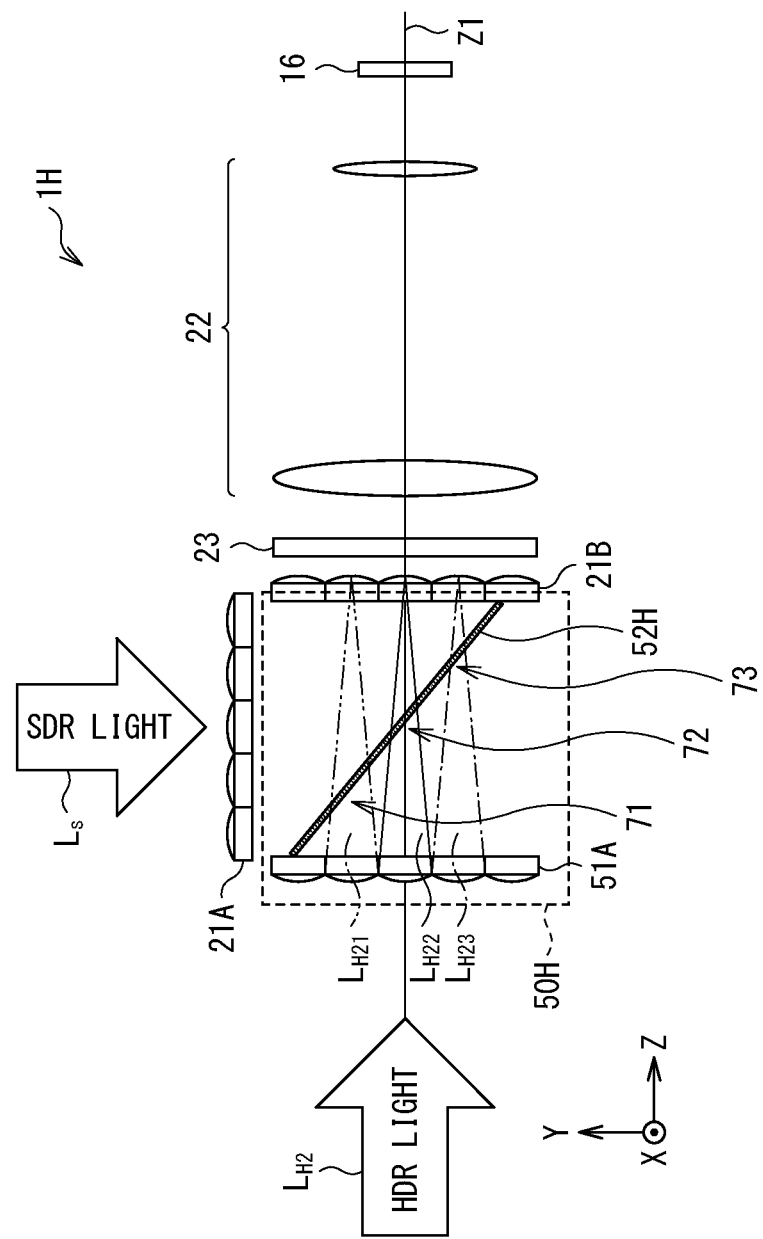
FIG. 20 is a configuration diagram schematically illustrating a configuration example of a main part of a projector according to a first modification example of the fifth embodiment.
Figure 21:
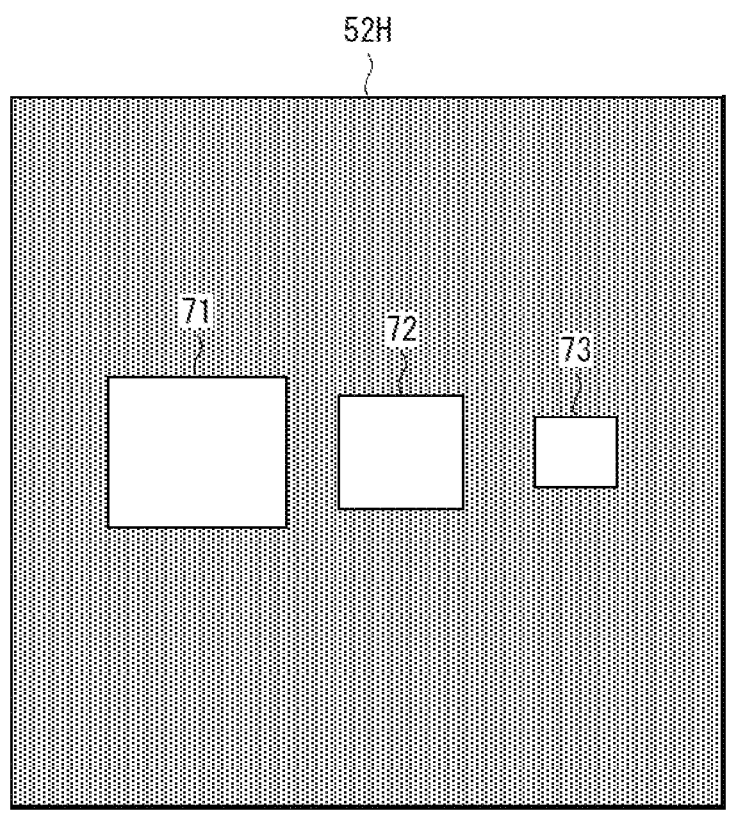
FIG. 21 is a plan view schematically illustrating a configuration example of a multiplexing mirror in the projector according to the first modification example of the fifth embodiment.

FIG. 20 schematically illustrates a configuration example of a main part of a projector 1H according to a first modification example of the fifth embodiment. FIG. 21 schematically illustrates a configuration example of a multiplexing mirror in the projector 1H according to the first modification example of the fifth embodiment.

The projector 1H according to the first modification example includes a multiplexing optical system 50H instead of the multiplexing optical system 50G in the projector 1G according to the fifth embodiment.

The multiplexing optical system 50H in the first modification example includes the multiplexing fly-eye lens 51A and a multiplexing mirror 52H.

In the multiplexing optical system 50H, the multiplexing fly-eye lens 51A generates the HDR light beams $L_{H21}$, $L_{H22}$, and $L_{H23}$, i.e., a plurality of light fluxes divided from the incident HDR light $L_{H2}$. It is to be noted that FIG. 20 exemplifies an example in which the multiplexing fly-eye lens 51A includes three lens elements and the light flux of the HDR light $L_{H2}$ is divided into three; however, the number of lens elements of the multiplexing fly-eye lens 51A and the number of divisions of the light fluxes may be each two. In addition, the number of the lens elements of the multiplexing fly-eye lens 51A and the number of divisions of the light fluxes may be each four or more.

The multiplexing mirror 52H has a plurality of transmission parts 71, 72, and 73 according to the number of divisions of the light fluxes divided by the multiplexing fly-eye lens 51A. The multiplexing mirror 52H is disposed to allow the plurality of transmission parts 71, 72, and 73 to be positioned on respective optical paths of the plurality of HDR light beams $L_{H21}$, $L_{H22}$, and $L_{H23}$ generated by the multiplexing fly-eye lens 51A. The plurality of transmission parts 71, 72, and 73 transmit, respectively, the plurality of HDR light beams $L_{H21}$, $L_{H22}$, and $L_{H23}$ generated by the multiplexing fly-eye lens 51A toward a plurality of lens elements of the second fly-eye lens 21B. The structure and transmission characteristics of each of the plurality of transmission parts 71, 72, and 73 are substantially similar to those of the transmission part 70 in the multiplexing optical system 50G. It is to be noted that the plurality of HDR light beams $L_{H21}$, $L_{H22}$, and $L_{H23}$ generated by the multiplexing fly-eye lens 51A are incident on the multiplexing mirror 52H at different positions in the Z-direction with respect to the optical axis Z1 of the integrator optical system 20. For this reason, the light flux diameters of the plurality of HDR light beams $L_{H21}$, $L_{H22}$, and $L_{H23}$ that are incident on the multiplexing mirror 52H are of different respective sizes depending on positions of incidence. The sizes of the plurality of transmission parts 71, 72, and 73 are sizes corresponding to the light flux diameters of the plurality of HDR light beams $L_{H21}$, $L_{H22}$, and $L_{H23}$ that are incident on the multiplexing mirror 52H, and thus are sizes different from each other.

Other configurations, operations, and effects may be substantially similar to those of the illumination device and the projector 1G according to the foregoing fifth embodiment.

Second Modification Example of Fifth Embodiment

Figure 22:
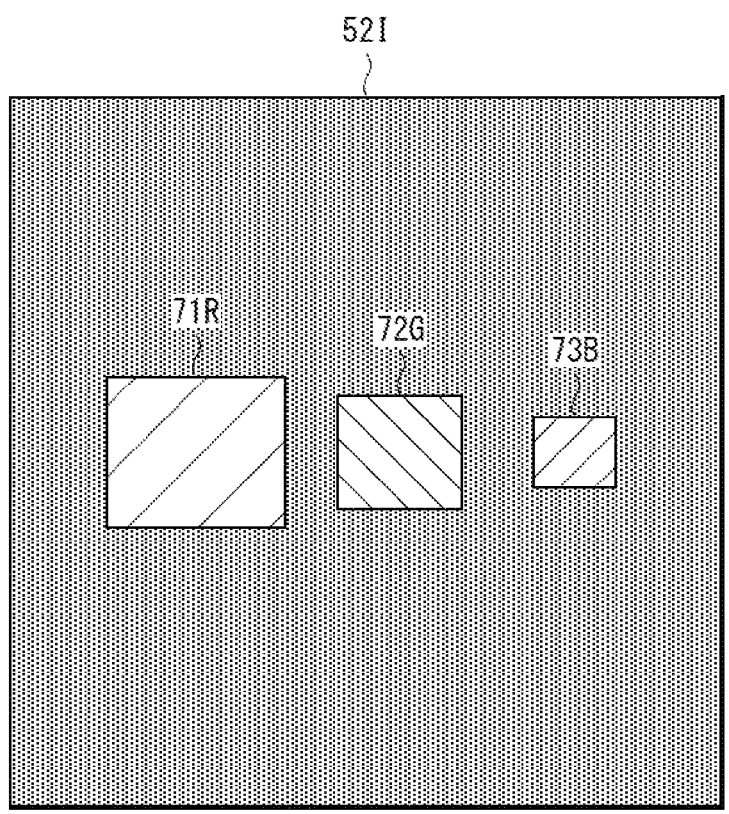
FIG. 22 is a plan view schematically illustrating a configuration example of a multiplexing mirror in a projector according to a second modification example of the fifth embodiment.

FIG. 22 is a plan view schematically illustrating a configuration example of a multiplexing mirror 52I in a projector according to a second modification example of the fifth embodiment.

Similarly to the projector 1B according to the second embodiment, the projector according to the second modification example has a configuration corresponding to color display.

A multiplexing optical system in the projector according to the second modification example includes the multiplexing fly-eye lens 51A and the multiplexing mirror 52I.

Similarly to the projector 1B according to the second embodiment, the HDR light $L_{H2}$ including the plurality of color light beams (red HDR light $L_{HR}$, green HDR light $L_{HG}$, and blue HDR light $L_{HB}$) enters the multiplexing optical system in the projector according to the second modification example. The mutually different color light beams (red HDR light $L_{HR}$, green HDR light $L_{HG}$, and blue HDR light $L_{HB}$) enter a plurality of lens elements of the multiplexing fly-eye lens 51A.

The multiplexing mirror 52I includes a plurality of transmission parts (a red transmission part 71R, a green transmission 72G, and a blue transmission part 73B) that transmit respective color light beams having been modulated by the first spatial light modulator 13 at spatially different positions for respective colors. The multiplexing mirror 52I is disposed to allow the red transmission part 71R, the green transmission 72G, and the blue transmission part 73B to be positioned on respective optical paths of the red HDR light $L_{HR}$, the green HDR light $L_{HG}$ and the blue HDR light $L_{HB}$ from the multiplexing fly-eye lens 51A. The red transmission part 71R, the green transmission 72G, and the blue transmission part 73B transmit, respectively, the red HDR light $L_{HR}$, the green HDR light $L_{HG}$, and the blue HDR light $L_{HB}$ from the multiplexing fly-eye lens 51A toward a plurality of lens elements of the second fly-eye lens 21B. In the multiplexing mirror 52I, a region other than the red transmission part 71R, the green transmission 72G, and the blue transmission part 73B may be a reflective mirror or a dichroic mirror that reflects the SDR light $L_S$.

It is to be noted that the red HDR light $L_{HR}$, the green HDR light $L_{HG}$, and the blue HDR light $L_{HB}$ from the multiplexing fly-eye lens 51A are incident on the multiplexing mirror 52I at spatially different positions in the Z-direction with respect to the optical axis Z1 of the integrator optical system 20. For this reason, the light flux diameters of respective color light beams incident on the multiplexing mirror 52I are of different respective sizes depending on positions of incidence. The sizes of the red transmission part 71R, the green transmission 72G, and the blue transmission part 73B are sizes corresponding to the light flux diameters of the respective color light beams incident on the multiplexing mirror 52I, and thus are sizes different from each other.

Other configurations, operations, and effects may be substantially similar to those of the illumination device and the projector 1B according to the foregoing second embodiment or the illumination device and the projector 1H according to the first modification example of the fifth embodiment.

6. Other Embodiments

The technique according to the present disclosure is not limited to the descriptions of the foregoing embodiments, and may be modified in a wide variety of ways.

For example, the description has been given, in each of the foregoing embodiments, by exemplifying the case where the illumination device is applied to the projector and where the illumination target by the illumination device is the second spatial light modulator 16 that generates a projection image. However, the illumination device may be applied to an apparatus other than the projector.

For example, the present technology may have the following configurations.

According to the present technology having the following configurations, the first light having been modulated by the first spatial light modulator and the second light having entered the first fly-eye lens of the integrator optical system are multiplexed in the optical path between the first fly-eye lens and the illumination target, thus making it possible to achieve a high dynamic range and to suppress a decrease in the light utilization efficiency.

(1)

An illumination device including:

a first light source unit that emits first light of a first wavelength band;

a first spatial light modulator where the first light from the first light source unit enters;

a second light source unit that emits second light of a second wavelength band;

an integrator optical system including a first fly-eye lens where the second light from the second light source unit enters, the integrator optical system generating illumination light for an illumination target on a basis of the first light having been modulated by the first spatial light modulator and on a basis of the second light from the second light source unit; and a multiplexing optical system that multiplexes the second light having entered the first fly-eye lens and the first light having been modulated by the first spatial light modulator, in an optical path between the first fly-eye lens and the illumination target.

(2)

The illumination device according to (1), in which the second wavelength band includes the first wavelength band, and is a band wider than the first wavelength band.

(3)

The illumination device according to (1) or (2), in which the illumination target includes a second spatial light modulator that modulates the illumination light to generate a projection image.

(4)

The illumination device according to any one of (1) to (3), in which the multiplexing optical system includes at least one multiplexing mirror disposed in the optical path between the first fly-eye lens and the illumination target, and the multiplexing mirror includes at least one reflection part that reflects the first light having been modulated by the first spatial light modulator or at least one transmission part that transmits the first light having been modulated by the first spatial light modulator.

(5)

The illumination device according to (4), in which the multiplexing optical system further includes a multiplexing lens that causes the first light having been modulated by the first spatial light modulator to enter the optical path between the first fly-eye lens in the integrator optical system and the illumination target.

(6)

The illumination device according to (4) or (5), in which the second wavelength band includes the first wavelength band, and is a band wider than the first wavelength band, and the reflection part in the multiplexing mirror has a reflective function for the first wavelength band and has a transmissive function for a band other than the first wavelength band in the second wavelength band.

(7)

The illumination device according to any one of (1) to (6), in which the integrator optical system further includes a second fly-eye lens paired with the first fly-eye lens, and the multiplexing optical system multiplexes the second light having entered the first fly-eye lens and the first light having been modulated by the first spatial light modulator, in an optical path between the first fly-eye lens and the second fly-eye lens.

(8)

The illumination device according to any one of (1) to (6), in which the integrator optical system further includes a second fly-eye lens paired with the first fly-eye lens, the second fly-eye lens is disposed between the first fly-eye lens and the illumination target, and the multiplexing optical system multiplexes the second light having entered the first fly-eye lens and the first light having been modulated by the first spatial light modulator, in an optical path between the second fly-eye lens and the illumination target.

(9)

The illumination device according to (8), in which the integrator optical system further includes a polarization conversion element disposed between the second fly-eye lens and the illumination target.

(10)

The illumination device according to (9), in which the multiplexing optical system includes a pair of multiplexing fly-eye lenses that cause the first light having been modulated by the first spatial light modulator to enter the optical path between the second fly-eye lens in the integrator optical system and the illumination target.

(11)

The illumination device according to (9) or (10), in which the multiplexing optical system multiplexes the second light having entered the first fly-eye lens and the first light having been modulated by the first spatial light modulator, in an optical path between the second fly-eye lens and the polarization conversion element.

(12)

The illumination device according to (9) or (10), in which the multiplexing optical system multiplexes the second light having entered the first fly-eye lens and the first light having been modulated by the first spatial light modulator, in an optical path between the polarization conversion element and the illumination target.

(13)

The illumination device according to any one of (1) to (7), in which the first light includes a plurality of color light beams, and the multiplexing optical system multiplexes the respective color light beams having been modulated by the first spatial light modulator with the second light having entered the first fly-eye lens at mutually different positions in the optical path between the first fly-eye lens and the illumination target.

(14)

The illumination device according to (13), in which the multiplexing optical system includes the multiplexing mirror disposed in the optical path between the first fly-eye lens and the illumination target, and the multiplexing mirror includes a plurality of reflection parts that reflect the respective color light beams having been modulated by the first spatial light modulator, or a plurality of transmission parts that transmit the respective color light beams having been modulated by the first spatial light modulator.

(15)

The illumination device according to (13), in which the multiplexing optical system includes a plurality of multiplexing mirrors disposed in the optical path between the first fly-eye lens and the illumination target, the plurality of multiplexing mirrors reflecting the respective color light beams.

(16)

A projector including:

an illumination device including a first spatial light modulator where first light of a first wavelength band enters; and a second spatial light modulator that modulates illumination light from the illumination device to generate a projection image on a basis of an image signal, the illumination device further including a first light source unit that emits the first light of the first wavelength band, a second light source unit that emits second light of a second wavelength band, an integrator optical system including a first fly-eye lens where the second light from the second light source unit enters, the integrator optical system generating illumination light for the second spatial light modulator on a basis of the first light having been modulated by the first spatial light modulator and on a basis of the second light from the second light source unit, and a multiplexing optical system that multiplexes the second light having entered the first fly-eye lens and the first light having been modulated by the first spatial light modulator, in an optical path between the first fly-eye lens and the illumination target.

(17)

The projector according to (16), further including a projection optical system that projects the projection image generated by the second spatial light modulator onto a projection plane.

(18)

The projector according to (16) or (17), in which the first spatial light modulator modulates the first light from the first light source unit on a basis of a signal of a high luminance region included in the image signal.

This application claims the benefit of Japanese Priority Patent Application JP2018-138366 filed with the Japan Patent Office on Jul. 24, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An illumination device, comprising:
a first light source configured to emit first light of a first wavelength band;
a first spatial light modulator where the first light from the first light source enters;
a second light source configured to emit second light of a second wavelength band, wherein the second wavelength band includes the first wavelength band, and is a wider band than the first wavelength band;
an integrator optical system including a first fly-eye lens where the second light from the second light source enters, the integrator optical system being configured to generate illumination light for an illumination target on a basis of the first light having been modulated by the first spatial light modulator and on a basis of the second light from the second light source; and a multiplexing optical system configured to multiplex the second light having entered the first fly-eye lens and the first light having been modulated by the first spatial light modulator, in an optical path between the first fly-eye lens and the illumination target.

2. An illumination device, comprising:

a first light source configured to emit first light of a first wavelength band;

a first spatial light modulator where the first light from the first light source enters;

a second light source configured to emit second light of a second wavelength band;

an integrator optical system including a first fly-eye lens where the second light from the second light source enters the integrator optical system being configured to generate illumination light for an illumination target on a basis of the first light having been modulated by the first spatial light modulator and on a basis of the second light from the second light source unit; and a multiplexing optical system configured to multiplex the second light having entered the first fly-eye lens and the first light having been modulated by the first spatial light modulator, in an optical path between the first fly-eye lens and the illumination target, wherein the first light includes a plurality of color light beams, and wherein the multiplexing optical system multiplexes the respective color light beams having been modulated by the first spatial light modulator with the second light having entered the first fly-eye lens at mutually different positions in the optical path between the first fly-eye lens and the illumination target.

3. The illumination device according to claim 1, wherein the illumination target comprises a second spatial light modulator that modulates the illumination light to generate a projection image.

4. The illumination device according to claim 1, wherein
the multiplexing optical system includes at least one multiplexing mirror disposed in the optical path between the first fly-eye lens and the illumination target, and the multiplexing mirror includes at least one reflection part that reflects the first light having been modulated by the first spatial light modulator or at least one transmission part that transmits the first light having been modulated by the first spatial light modulator.

5. The illumination device according to claim 4, wherein the multiplexing optical system further includes a multiplexing lens that causes the first light having been modulated by the first spatial light modulator to enter the optical path between the first fly-eye lens in the integrator optical system and the illumination target.

6. The illumination device according to claim 1,
wherein the multiplexing optical system includes at least One multiplexing mirror disposed in the optical path between the first fly-eye lens and the illumination target, wherein the multiplexing mirror includes at least one reflection part that reflects the first light having been modulated by the first spatial light modulator or at least one transmission part that transmits the first light having been modulated by the first spatial light modulator, wherein the reflection part in the multiplexing mirror has a reflective function for the first wavelength band and has a transmissive function for a band other than the first wavelength band in the second wavelength band.

7. The illumination device according to claim 1,
wherein
the integrator optical system further includes a second fly-eye lens paired with the first fly-eye lens, and the multiplexing optical system multiplexes the second light having entered the first fly-eye lens and the first light having been modulated by the first spatial light modulator, in an optical path between the first fly-eye lens and the second fly-eye lens.

8. The illumination device according to claim 1,
wherein
the integrator optical system further includes a second fly-eye lens paired with the first fly-eye lens, the second fly-eye lens is disposed between the first fly-eye lens and the illumination target, and the multiplexing optical system multiplexes the second light having entered the first fly-eye lens and the first light having been modulated by the first spatial light modulator, in an optical path between the second fly-eye lens and the illumination target.

9. The illumination device according to claim 8, wherein the integrator optical system further includes a polarization conversion element disposed between the second fly-eye lens and the illumination target.

10. The illumination device according to claim 9, wherein the multiplexing optical system includes a pair of multiplexing fly-eye lenses that cause the first light having been modulated by the first spatial light modulator to enter the optical path between the second fly-eye lens in the integrator optical system and the illumination target.

11. The illumination device according to claim 9, wherein the multiplexing optical system multiplexes the second light having entered the first fly-eye lens and the first light having been modulated by the first spatial light modulator, in an optical path between the second fly-eye lens and the polarization conversion element.

12. The illumination device according to claim 9, wherein the multiplexing optical system multiplexes the second light having entered the first fly-eye lens and the first light having been modulated by the first spatial light modulator, in an optical path between the polarization conversion element and the illumination target.

13. The illumination device according to claim 2, wherein the second wavelength band includes the first wavelength band, and is a band wider than the first wavelength band.

14. The illumination device according to claim 2, wherein
the multiplexing optical system includes a multiplexing mirror disposed in the optical path between the first fly-eye lens and the illumination target, and the multiplexing mirror includes a plurality of reflection parts that reflect the respective color light beams having been modulated by the first spatial light modulator, or a plurality of transmission parts that transmit the respective color light beams having been modulated by the first spatial light modulator.

15. The illumination device according to claim 2, wherein the multiplexing optical system includes a plurality of multiplexing mirrors disposed in the optical path between the first fly-eye lens and the illumination target, the plurality of multiplexing mirrors reflecting the respective color light beams.

16. A projector, comprising:
an illumination device including a first spatial light modulator where first light of a first wavelength band enters; and
a second spatial light modulator that modulates illumination light from the illumination device to generate a projection image on a basis of an image signal,
the illumination device further including:
- a first light source configured to emit the first light of the first wavelength band;
- a second light source configured to emit second light of a second wavelength band, wherein the second wavelength band includes the first wavelength band, and is a wider band than the first wavelength band;
- an integrator optical system including a first fly-eye lens where the second light from the second light source unit enters, the integrator optical system being configured to generate illumination light for the second spatial light modulator on a basis of the first light having been modulated by the first spatial light modulator and on a basis of the second light from the second light source unit; and
- a multiplexing optical system configured to multiplex the second light having entered the first fly-eye lens and the first light having been modulated by the first spatial light modulator, in an optical path between the first fly-eye lens and the illumination target.

17. The projector according to claim 16, further comprising a projection optical system that projects the projection image generated by the second spatial light modulator onto a projection plane.

18. The projector according to claim 16, wherein the first spatial light modulator modulates the first light from the first light source unit on a basis of a signal of a high luminance region included in the image signal.

19. The illumination device according to claim 2, wherein the illumination target comprises a second spatial light modulator that modulates the illumination light to generate a projection image.

20. The illumination device according to claim 2, wherein
the multiplexing optical system includes at least one multiplexing mirror disposed in the optical path between the first fly-eye lens and the illumination target, and
the multiplexing mirror includes at least one reflection part that reflects the first light having been modulated by the first spatial light modulator or at least one transmission part that transmits the first light having been modulated by the first spatial light modulator.

* * * * *